(12) United States Patent
Vose et al.

(10) Patent No.: US 10,192,445 B1
(45) Date of Patent: *Jan. 29, 2019

(54) SYSTEMS AND METHODS FOR DETERMINING A VEHICLE IS AT AN ELEVATED RISK FOR AN ANIMAL COLLISION

(71) Applicant: State Farm Mutual Automobile Insurance Company, Bloomington, IL (US)

(72) Inventors: Matthew E. Vose, Bloomington, IL (US); Michael Bernico, Bloomington, IL (US); Milton Mowery, Bloomington, IL (US); Tim G. Sanidas, Bloomington, IL (US); Christopher Zimmer, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,939

(22) Filed: Jun. 12, 2018

Related U.S. Application Data

(63) Continuation of application No. 15/873,202, filed on Jan. 17, 2018, which is a continuation of application (Continued)

(51) Int. Cl.
*G08G 1/16* (2006.01)
*G05D 1/02* (2006.01)
(Continued)

(52) U.S. Cl.
CPC .............. *G08G 1/166* (2013.01); *G01S 19/42* (2013.01); *G05D 1/0278* (2013.01);
(Continued)

(58) Field of Classification Search
CPC ........ G08G 1/166; G08G 1/167; G08G 1/165; G08G 1/096716; G08G 1/0969;
(Continued)

(56) References Cited

U.S. PATENT DOCUMENTS 6,370,475 B1 4/2002 Breed et al.
6,940,424 B2 9/2005 Philiben et al.
(Continued)

OTHER PUBLICATIONS

Ragab et al., "GPS-Based Camel-Vehicle Accidents Avoidance System: Designing, Deploying and Testing," International Journal of Innovative Computing, Information and Control, vol. 9, No. 7, pp. 2887-2906 (2013).

(Continued)

*Primary Examiner* — Kabir A Timroy

(57) ABSTRACT

Methods and systems for displaying a user interface that warns a driver that a vehicle is located within or is near a geographical area (and/or intersection) associated with a higher than average risk of animal-vehicle and/or vehicle-vehicle collisions are provided. According to certain aspects, an electronic device may access a database that identifies a plurality of high risk areas, including areas associated with prior vehicle accidents. The electronic device may display a virtual road map, as well as an icon indicating the vehicle's current location and a plurality of visual indications of high-risk areas. When the electronic device detects that the current location of the vehicle is within and/or approaching a high-risk area, the electronic device may then warn the driver about the higher than average risk of experiencing a vehicle collision.

19 Claims, 10 Drawing Sheets

Related U.S. Application Data

No. 15/452,296, filed on Mar. 7, 2017, now Pat. No. 9,922,374, which is a continuation of application No. 14/702,150, filed on May 1, 2015, now Pat. No. 9,656,606, which is a continuation-in-part of application No. 14/564,960, filed on Dec. 9, 2014.

(60) Provisional application No. 62/005,644, filed on May 30, 2014.

(51) Int. Cl.

| | | |
|---|---|---|
| G08G 1/09 | (2006.01) | |
| G08G 1/123 | (2006.01) | |
| G08G 1/01 | (2006.01) | |
| G01S 19/42 | (2010.01) | |

(52) U.S. Cl.
CPC ......... *G08G 1/0129* (2013.01); *G08G 1/0133* (2013.01); *G08G 1/094* (2013.01); *G08G 1/123* (2013.01)

(58) Field of Classification Search
CPC . G08G 1/16; G08G 9/02; G06Q 40/08; B60Q 9/008; B60W 2550/402; B60W 30/095; B60W 30/08
See application file for complete search history.

(56) References Cited

U.S. PATENT DOCUMENTS

| | | | |
|---|---|---|---|
| 7,426,437 B2 * | 9/2008 | Breed | B60N 2/2863 340/435 |
| 8,384,532 B2 | 2/2013 | Szczerba et al. | |
| 8,547,249 B2 | 10/2013 | David et al. | |
| 9,020,751 B1 | 4/2015 | Bogovich | |
| 2003/0090391 A1 | 5/2003 | Philiben | |
| 2005/0197771 A1 | 9/2005 | Seick | |
| 2010/0020170 A1 | 1/2010 | Higgins-Luthman | |
| 2012/0123806 A1 | 5/2012 | Schumann, Jr. et al. | |
| 2013/0186322 A1 | 7/2013 | Livingston | |
| 2013/0282357 A1 | 10/2013 | Rubin | |
| 2014/0067800 A1 | 3/2014 | Sharma | |
| 2014/0278047 A1 | 9/2014 | Bahl et al. | |
| 2015/0069118 A1 | 3/2015 | Roys | |

OTHER PUBLICATIONS

Ragab, "Simulating Camel Vehicle Accidents Avoidance System," International Journal of Future Generation Communication and Networking, vol. 4, No. 4, 43-56 (2011).

Zahrani et al. "Design of GPS-Based System to Avoid Camel-Vehicle Collisions: A Review," Asian Journal of Applied Sciences, vol. 4, No. 4, pp. 362-377 (2011).

Likenneturva introduces moose alert application for smart phones, May 25, 2011, http://likennaturva.magazine.fi/wwww/en/index.php?we_objectID=7363.

* cited by examiner

SYSTEMS AND METHODS FOR DETERMINING A VEHICLE IS AT AN ELEVATED RISK FOR AN ANIMAL COLLISION

CROSS REFERENCE TO RELATED APPLICATIONS

This present application is a continuation of and claims priority to U.S. patent application Ser. No. 15/873,202, which is a continuation of U.S. patent application Ser. No. 15/452,296, filed Mar. 7, 2017, entitled "Systems and Methods for Alerting a Driver to Vehicle Collision Risks" (now U.S. Pat. No. 9,922,374), which is a continuation of U.S. patent application Ser. No. 14/702,150, filed on May 1, 2015, entitled "Systems and Methods for Alerting a Driver to Vehicle Collision Risks" (now U.S. Pat. No. 9,656,606), which is a continuation-in-part of U.S. patent application Ser. No. 14/564,960, filed Dec. 9, 2014, entitled "Systems and Methods for Determining a Vehicle is at an Elevated Risk for an Animal Collision", and which claims benefit of U.S. Provisional Patent Application No. 62/005,644, filed May 30, 2014, each of which is hereby incorporated herein by reference in its entirety.

FIELD OF THE DISCLOSURE

The present disclosure generally relates to improving vehicle safety and, more particularly, to systems and methods for providing a user interface to alert a driver to vehicle collision risks.

BACKGROUND

Vehicle or automobile insurance exists to provide financial protection against physical damage and/or bodily injury resulting from traffic accidents and against liability that could arise therefrom. One common type of traffic accident occurs when a customer's vehicle collides with an animal, such as a deer crossing a road. Certain animal collisions may result in significant bodily injury or even death. Further, when a customer's vehicle collides with an animal, insurance claims may be generated to cover the expenses associated with vehicle repair and/or personal injury.

The present embodiments may, inter alia, alleviate the foregoing risks, such as the risk of bodily injury, vehicular damage, insurance claims, and/or other risks.

SUMMARY

A system and method may reduce vehicle collisions with animals by warning a vehicle and/or occupants thereof of certain risks. A mobile device and/or vehicle control system may alert the vehicle and/or vehicle occupants that a moving vehicle is about to enter an area associated with a higher than average, or otherwise high likelihood, of animals and/or collisions therewith. As a result, the vehicle and/or driver may utilize more caution, lower speed, and/or take other appropriate actions. Once the vehicle passes through the area of elevated risk of animal collision, the mobile device and/or vehicle control system may inform the vehicle and/or vehicle occupants so that normal vehicle operation may resume. Additionally, customer input or data may be utilized to improve the accuracy of the warning system.

In an aspect, a method to facilitate safer driver and reduce vehicle accidents by alerting a driver of a vehicle about high-risk areas via an application executing on an electronic device (e.g., mobile device, vehicle display, vehicle navigation unit, and/or other computing devices) may be provided. The electronic device may include one or more processors and a memory coupled to the one or more processors. The method may comprise (1) the application causing the one or more processors to access data detailing a plurality of prior vehicle accidents, wherein the data includes a plurality of prior vehicle accident locations; (2) causing the one or more processors to display a primary interface in the application executing on the electronic device, the primary interface displaying at least: (i) a virtual road map, (ii) a virtual representation of a current location for the vehicle, and (iii) at least a portion of the plurality of virtual representations corresponding to the plurality of prior vehicle accident locations; (3) the application causing the one or more processors to update the current location of the vehicle in response to the vehicle moving to a new location; and/or (4) when the current location of the vehicle is within a threshold distance or radius of at least one of the plurality of prior vehicle accident locations, the application causing the one or more processors to generate a warning to alert the driver of the vehicle that the current location corresponds to a high-risk area indicating a higher than average risk of vehicle accidents. The method may include additional, fewer or alternative actions, including those described elsewhere herein.

In another aspect, a computer-implemented method of alerting a driver of a vehicle about high-risk areas may be provided. The method may comprise (1) displaying, via one or more processors (i) a virtual road map, (ii) a virtual representation of the current location of the vehicle, and (iii) at least a portion of a plurality of virtual representations corresponding to a plurality of high-risk areas, wherein the plurality of high-risk areas correspond to a plurality of prior vehicle accidents; (2) updating, via the one or more processors, the current location of the vehicle in response to the vehicle moving to a new location; and/or (3) displaying, via the one or more processors, the virtual representation of the updated current location of the vehicle on the virtual road map at a location representative of the new location. The method may include generating an alert when the current location of the vehicle comes within a predetermined distance of a high-risk area. The method may include additional, fewer or alternative actions, including those described elsewhere herein.

In still another aspect, a graphical user interface for alleviating a risk of a vehicle collision may be provided. The graphical user interface may comprise (1) a virtual road map; (2) an icon virtually representing a current location of a vehicle, the icon depicted on the virtual road map at the current location of the vehicle; (3) a first plurality of virtual danger zones representing past vehicle-animal collisions, each of the first plurality of virtual danger zones depicted on the virtual road map at a latitude and a longitude of the respective past vehicle-animal collision; and/or (4) a second plurality of virtual danger zones representing a past vehicle-vehicle collisions, each of the plurality of second virtual danger zones depicted on the virtual road map at a latitude and a longitude of the respective past vehicle-animal collision. The graphical user interface may be further configured to generate an alert when the current location of the vehicle moves to within a predefined radius or distance of one of the virtual danger zones. The graphical user interface may include additional, fewer or alternative elements, including those described elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
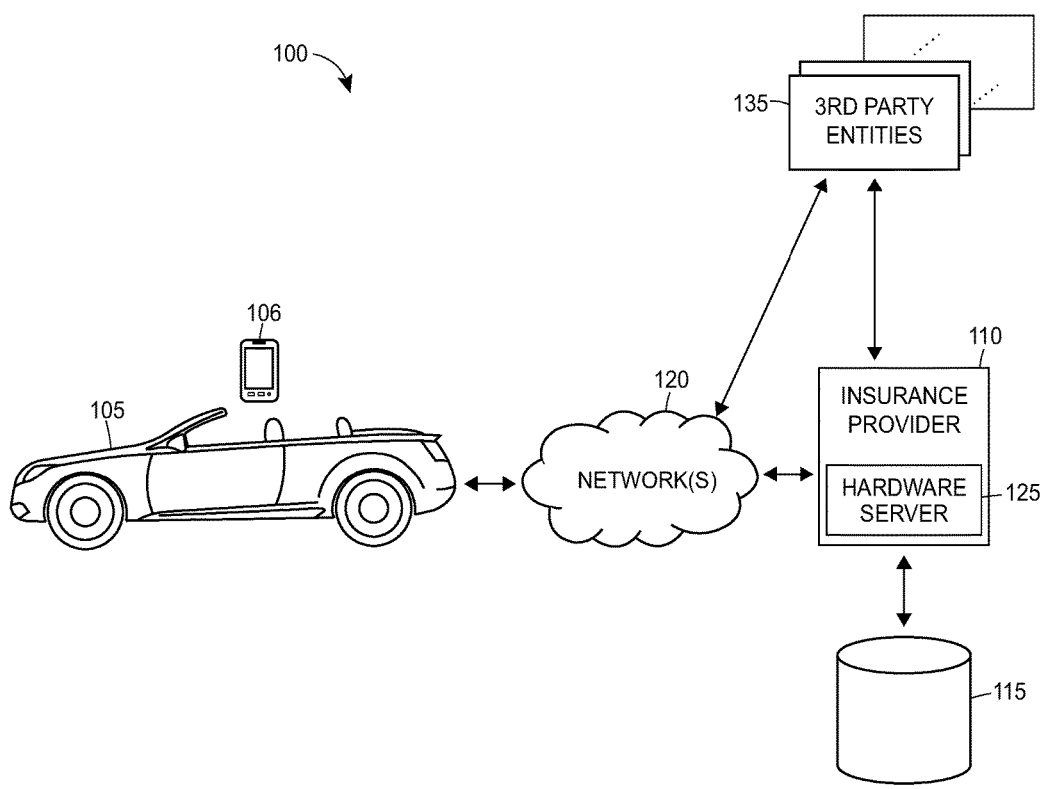
FIG. 1 depicts an example environment including components and entities associated with determining that the vehicle is at an elevated risk for an animal collision in accordance with some embodiments.

The present embodiments relate to, inter alia, creating a database of animal induced vehicle accidents, such as accidents involving automobiles striking deer or other animals. Each accident entry into the database may include associated information, such as information related to: accident location (e.g., GPS (Global Positioning System), GNSS (Global Navigation Satellite System), latitude/longitude coordinate, road and mile marker, or other location information); time of accident; day of year of the accident; weather at the time of the accident; road or road type on which the accident occurred; driver information or characteristics of the driver involved in the accident; type of animal involved in the accident; type of vehicle involved in the accident; geography surrounding the area, or in the vicinity, of the accident (such as hills, flat, river or creek bed, river or creek crossing, heavily or lightly wooded, open land, etc.); nearby fields (such as corn, wheat, or soybean fields, pasture or brush, etc.); real time or predicted time of harvest (such as corn or soybeans being combined in the fall); wetlands; animal preserves, animal tendencies or characteristics (such as animal mating season, migratory tendencies, animal movement and eating tendencies, hunting season(s)); events that may impact traffic; real time or predicted traffic conditions; real time or anticipated road construction; and/or other information.

Once the database of vehicle-animal accidents is built, such as by using the past vehicle-animal accident data for several years, one or more algorithms may analyze the accident data to identify and/or predict certain areas and/or characteristics associated with a likelihood of a high risk of a vehicle-animal collision. In one embodiment, a processor may build one or more probabilistic or statistical models to help identify the likelihood of an animal collision event. The models may use the types of information identified above (such as accident location, time, day of year, weather, geography, etc.) associated with each vehicle-animal accident stored in the database or other memory unit. Linear regression or algorithms, or other modeling techniques, may be used (e.g., logistic regression, generalized linear models, neural networks, Bayesian networks, Gaussian regression, ensemble methods, and/or others). As a result of the analysis, the database may identify a plurality of geographical areas associated with a higher than average risk of vehicle collisions. As used herein, the terms "high-risk area" and "danger zone" may be used interchangeably to describe these geographical areas associated with a higher than average risk of vehicle collisions.

During use, an application on a mobile device, such as a smart phone, cell phone, tablet, phablet, laptop, notebook, PDA (personal digital assistant), pager, smart watch, handheld computing device, wearable electronic device, computer, access point, node, relay, other device capable of wireless RF (radio frequency) communication, etc., or on a vehicle system (such as a smart car or other vehicle-based computer or control system), may monitor the position of the vehicle and/or the mobile device (and thus the position of the vehicle in which the mobile device is traveling). The application may remotely or locally access the models and/or database.

If the current conditions associated with the mobile device, such as mobile device or vehicle location, time of day, day of year, weather, visibility, and other conditions match those associated with a high risk event identified in the model and/or database, an audible, vibrating, visual, or other type of alert or warning may be issued to warn the driver or other user of the mobile device that the vehicle is presently approaching, or is currently within, a high risk area having a relatively high likelihood of vehicle-animal collisions.

As an example, during deer mating season in Wisconsin, typically in November, deer may be especially active. In areas of high deer travel, such as along roads that pass though wooded areas, or on roads that pass over creeks, streams, or rivers, etc., the risk of a deer strike event may be especially high. The database may also identify that accidents are also more likely to occur during early evening hours.

Thus, by matching the vehicle's current location; the time of day; the day of year; and/or geography information with pre-identified areas of high risk that are stored in a memory, a mobile device may issue an audible alert, such as "High risk of animal collision for the next two miles." Preferably, the alert is non-distracting, such as an audible alert or vibration.

Although above mentioned an automobile-deer collision, the present embodiments may include automobile collisions with other types of animals, such as wild pigs, elk, bores, moose, birds, pheasants, ducks, geese, turkeys, cows, horses, raccoons, dogs, cats, pigs, bears, chickens, foxes, armadillos, alligators, lions, tigers, etc. The present embodiments may also include other types of vehicles, such as airplanes or boats. For instance, airplanes may collide with various types of birds, and boats may collide with various types of aquatic animals, such as whales.

I. Exemplary Risk Alleviation

The novel systems and methods disclosed herein relate generally to determining that a vehicle is at risk of experiencing an animal collision. In particular, the systems and methods analyze vehicle and environment data associated with a vehicle to determine that the vehicle is at an elevated risk of an animal collision, and notify a customer or vehicle operator of the elevated risk. According to certain aspects, if the customer experiences an animal collision, the customer may fill out and send an incident report to an insurance provider, which may use the data to improve its models for identifying animal collision risks.

The systems and methods therefore offer a benefit to customers by enabling drivers to receive sufficient warning that an animal collision may occur. By alerting drivers about the risk of an animal collision, drivers are more informed about the risks in operating the vehicle and may be more likely to modify driving behavior to avoid a potential animal collision. Further, insurance providers may experience a reduced number of claims as a result of fewer animal collisions, thus reducing their overall liabilities. Additionally, the systems and methods described herein may further the environmentalist goal of reducing unnatural animal deaths.

As used herein, it should be appreciated that the term "animal" may refer to any type of animal that may interfere with the path of a vehicle. Some exemplary animals include deer, moose, elk, armadillo, boar, coyote, and bear. The animal may also be aquatic (e.g., manatee or crocodile) or avian (e.g., goose or pigeon). The systems and methods discussed herein envision assessing risks for a plurality of vehicle types to collide with a plurality of types of animals. Any specific risk assessment for a vehicle-animal collision described herein is meant to be exemplary and not limiting.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

II. Exemplary Environment for Determining Elevated Risk

FIG. 1 depicts an example environment 100 associated with determining that the vehicle is at an elevated risk for an animal collision. Although FIG. 1 depicts certain entities, components, and devices, it should be appreciated that additional or alternate entities and components are envisioned.

As illustrated in FIG. 1, the environment 100 includes a vehicle 105 that may be any type of car, automobile, truck, motorcycle, fleet of vehicles, marine vessel, aeronautical vessel, or other vehicle capable of being driven or operated by a driver or operator. The vehicle 105 may have an electronic device 106 associated therewith configured to facilitate the functionalities as discussed elsewhere herein. In some cases, the electronic device 106 may be an on-board infotainment console inside the vehicle 105, such as part of an original equipment manufacturer (OEM) installation on the vehicle 105. In other cases, the electronic device 106 may belong to a driver or operator of the vehicle 105. As used herein, the terms "driver" and "vehicle operator" may be used interchangeably. For example, the electronic device 106 may be a smartphone of the vehicle operator. It should be appreciated that other types of electronic devices are envisioned, such as notebook computers, tablets, GPS devices, smart watches, and/or the like.

The electronic device 106 may be configured to communicate with an insurance provider 110 via a network 120. The network 120 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others). In general, an insurance provider may be an entity capable of assessing risks of various liability-generating incidents occurring. Although FIG. 1 depicts the insurance provider 110, it should be appreciated that other entities that are capable of assessing risk are envisioned. For example, a general risk assessing entity may be any individual, group of individuals, company, corporation, or other type of entity that can assess animal collision risks based upon certain information and provide information pertaining to any identified risks to the vehicle 105. According to embodiments, the insurance provider 110 may include one or more hardware server(s) 125 configured to facilitate the functionalities as discussed elsewhere herein. Although FIG. 1 depicts the hardware server 125 as a part of the insurance provider 110, it should be appreciated that the hardware server 125 may be separate from (and connected to or accessible by) the insurance provider 110 or a general risk assessing entity.

According to the present embodiments, the insurance provider 110 may generate and communicate an alert or notification to the electronic device 106, where the alert or notification warns or notifies the vehicle operator that the vehicle 105 may be at an elevated risk for an animal collision. In particular, the alert or notification may include information identifying a specific type of animal, a reason for the elevated risk, and/or any other relevant information. The alert or notification may additionally include information pertaining to the specific factors used to determine that the vehicle 105 may be at an elevated risk for an animal collision. For example, the alert or notification may state that a vehicle operator is at an elevated risk for a collision with a coyote due to the presence of nearby water.

Generally, vehicle operators navigate their vehicles through a plurality of environments that involve different levels of risks for animal collisions. The electronic device 106 may be configured to communicate various vehicle data associated with the vehicle 105 to the insurance provider 110. In the present embodiments, the vehicle data may include the location of the vehicle 105 (e.g., GPS coordinates of the vehicle). Further, the vehicle data may alternatively or additionally include the speed of the vehicle 105, characteristics of the vehicle 105, or various demographic information corresponding to the vehicle operator. It is generally known to those in the art that other types of information may be communicated by the electronic device 106 (as well as by the vehicle operator). In the present embodiments, the insurance provider 110 may obtain the vehicle data directly from the electronic device 106 or from another device associated with the vehicle 105 (e.g., an on-board component).

The hardware server 125 may be coupled to a database 115 configured to store various environment data. In some embodiments, the database 115 may be configured to store and maintain a set of data that may be provided by one or more third party entities 135 and/or may relate to research conducted by the insurance provider 110. In other embodiments, the third party entities 135 may store the environment data. Exemplary third party entities may include, without limitation, databases that store accident records, weather reports, hunting data, animal population data, social media data and ecology data. The environment data may be associated with a set of factors that influence a vehicle's level of risk for an animal collision. In certain embodiments, the insurance provider 110 may use the location of the vehicle 105 to access relevant environment data stored in the database 115 or retrieve relevant environment data from the third party entities 135, where the retrieved or accessed environment data may be relevant to the area or environment nearby or in proximity to the location of the vehicle 105. In some embodiments, the database 115 may be accessed directly by the electronic device 106 and/or vehicle 105.

According to the present embodiments, the database 115 or the third party entities 135 may be configured to store or determine various data that details a plurality of various factors that may be used to assess risks of animal collisions. For example, the environment data may include ecological characteristics of the environment, characteristics of the roadway the vehicle 105 is travelling on, a historical record of past animal collisions, and/or other data. In some embodiments, the ecological characteristics may include various subfactors related to at least one of the following: proximity to bodies of water, the direction of water flow for those bodies of water, the density of tree coverage, and use of land for farming crops such as corn or wheat. In other embodiments, the roadway characteristics may also include various subfactors related to at least one of the following: the speed limit of the road, whether the road has guardrails or other fencing systems, the visibility on the roadway, and the roadway type. Although the terms "road" and "roadway" are used herein, it should be appreciated that analogous terms may be envisioned for paths on which the vehicle 105 may travel. In further embodiments, the environment data may also include seasonal data for a particular location or environment that may also impact the risk for an animal collision. As an example, the risk for an animal collision may increase during a particular animal's hunting season or mating season. It should be further appreciated that other environment factors that may impact a vehicle's risk for an animal collision are envisioned. Additionally, the database 115 may include a list of high risk areas (e.g., pairs of latitudes and longitudes) in which the environment factors, or any other factors, indicate the presence of a higher than average risk of a vehicle collision.

III. Exemplary Elevated Risk Communication

Figure 2:
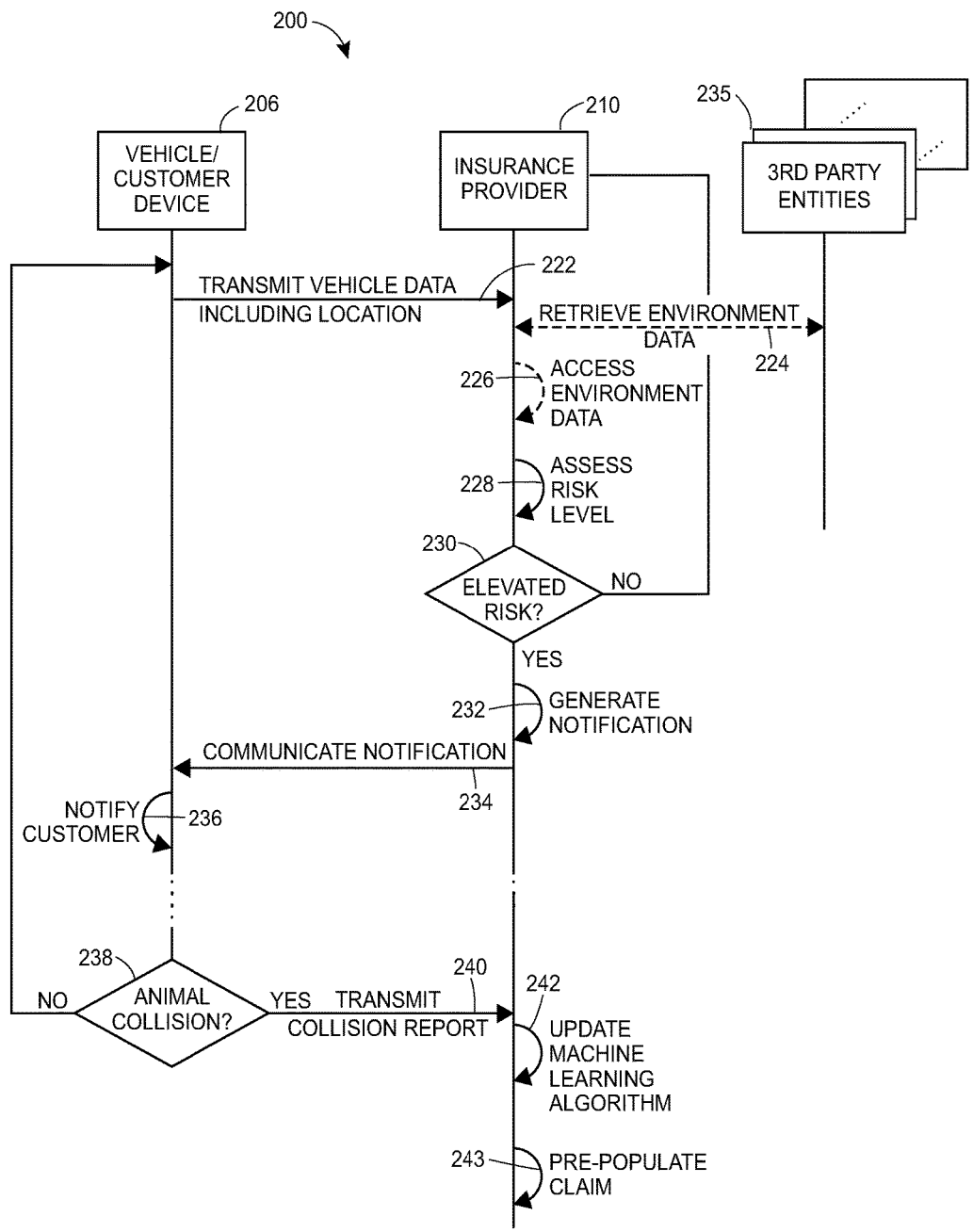
FIG. 2 depicts an example diagram associated with determining and communicating that a vehicle is at an elevated risk for an animal collision via a hardware server in accordance with some embodiments.

Referring to FIG. 2, illustrated is a signal diagram 200 associated with determining that a vehicle may be at an elevated risk for an animal collision, notifying a vehicle operator of the elevated risk, and/or receiving a collision report if an animal collision actually occurs. In particular, FIG. 2 includes a vehicle/customer device 206 (such as the electronic device 106 as described with respect to FIG. 1), an insurance provider 210 (such as the insurance provider 110 as described with respect to FIG. 1), and one or more third party entities 235 for storing environment data (such as the one or more third party entities 135 as described with respect to FIG. 1). In some embodiments, the insurance provider 210 may contain a database that stores the environment data (such as the database 115 as described with respect to FIG. 1). It should be appreciated that the vehicle/customer device 206 may include any electronic device associated with the vehicle (e.g., an on-board dash system) and/or any electronic device associated with a user/driver/operator of the vehicle (e.g., a vehicle operator's smartphone, laptop, etc.). Although only one vehicle/customer device 206 is depicted in FIG. 2, it should be appreciated that the insurance provider 210 may communicate with multiple vehicle/customer devices 206 to communicate respective notifications of an elevated risk for an animal collision and/or receive respective animal collision reports if an animal collision occurs.

The signal diagram 200 may begin when the vehicle/customer device 206 transmits (222) vehicle data, including at least a location of the vehicle, to the insurance provider 210 (or a remote server associated with the insurance provider). The vehicle data may further include information pertaining to, without limitation, the speed of the vehicle, vehicle characteristics, and/or demographic information corresponding to the vehicle operator. The vehicle/customer device 206 may be configured to automatically provide the vehicle data to the insurance provider 210. Further, the vehicle/customer device 206 may provide updated vehicle data at regular or semi-regular intervals. For example, the vehicle/customer device 206 may provide updated vehicle data to the insurance provider 210 every fifteen (15) minutes. In some embodiments, the vehicle operator may manually initiate transmission of the vehicle data to the insurance provider 210. After receiving the vehicle data from the vehicle/customer device 206, the insurance provider 210 may extract at least the vehicle location from the vehicle data.

In an optional embodiment, the insurance provider 210 may retrieve (224) environment data relevant to at least the location of the vehicle from the third party entities 235. In another optional embodiment, the insurance provider may access (226) environment data relevant to at least the location of the vehicle from a database local to the insurance provider 210. In some embodiments, the third party entities 235 or database local to the insurance provider 210 may maintain a record of environment data for various locations.

The environment data relevant to the location of the vehicle may include various environment factors as well as different categories of information for the particular environment data. In some embodiments, these environment factors (e.g., ecological characteristics) may be further divided into a set of subfactors (e.g., proximity to water or tree coverage). In other embodiments, the environment data may include a record of previous incidents, such as an animal collision that occurred within a mile of the vehicle's location within the last month. In further embodiments, the environment data may include factors related to the time of year or the time of day.

An example describing the interaction of the various environment factors is detailed as follows. Assume that a driver is driving on a country highway during the evening (7:00 PM) and also during moose mating season. On the left side of the road is a stream flowing in the direction of travel and on the right side of the road is a cornfield. Accident records for the area indicate several moose collisions have occurred on this particular stretch of road during the last month. In analyzing the environment data, the system may determine that during mating season, moose are more likely to be mobile in the evening and that moose are more likely to find mates near running water. The system may also determine the moose are likely to eat corn before looking for a mate. As such, the system may determine that there is an elevated risk for a moose collision due to the likelihood of a moose, while looking for a mate, crossing the road from the cornfield to the stream (i.e., crossing from right side of the road to the left side of the road). Additionally, the system may further determine that the time of day indicates reduced visibility due to either darkness or sun glare, which may further increase the risk of collision. Still further, the system may determine that the country highway contains no roadside barriers to prevent animal crossings and may adjust the level of risk accordingly. The system may increase the determined risk even further based upon the historical record of past moose collisions on this stretch of the road. While the above example describes the system analyzing the environment risk factors for the risk of a moose collision, it should be appreciated that the system may be capable of analyzing similar environment data to calculate the risk of collision with a plurality of other various animals. For example, in addition to determining that a vehicle is at an elevated risk for a moose collision, it may also determine that possum are generally at rest around 7:00 PM, and therefore there is a low risk for a possum collision.

The insurance provider 210 may assess (228) a level of risk for the vehicle to experience an animal collision based upon the localized environment data. In assessing the level of risk for the vehicle to experience an animal collision, the insurance provider 210 may supplement the localized environment data with vehicle data other than the vehicle's location. Similar to the environment data, the non-location vehicle data may include a set of vehicle factors that may or may not be further divided into subfactors. For example, the non-location vehicle data may include various vehicle characteristics that may be divided into exemplary subfactors such as age of the vehicle, time since last brake replacement, vehicle maintenance information, and/or other information.

An example describing the interaction of the various environment factors is detailed as follows. Assume that an elderly person is driving a car manufactured in 1982. The mileage on the car indicates that a brake replacement should have occurred 5000 miles ago. The system may determine that the driver is at an elevated risk for an animal collision due to his advanced age since the driver has reduced reaction times, thus impairing his ability to avoid a collision. Additionally or alternatively, the system may automatically determine that the vehicle has been driven a substantial amount of time or miles in a given day by a single operator, and thus that operator may be fatigued or have a lower level of alertness. The system may further determine that the age of the vehicle and its need for new brakes reduces the ability of the vehicle to come to a stop quickly further elevating the determined level of risk.

In assessing the level of risk for the vehicle to experience an animal collision, the insurance provider 210 may implement one or more machine learning algorithms. In particular, the insurance provider 210 may use a machine learning algorithm to assign weights to one or more environment factors or subfactors. The machine learning algorithm may calculate the specific weight for each factor or subfactor using a formula to assist in various statistical analyses (e.g., linear/logistic regression, generalized linear models, neural networks, Bayesian networks, Gaussian regression, ensemble methods, and/or others). In some cases, implementing and comparing an ensemble of different machine learning algorithms may provide better predictive performance than individual machine learning algorithms. The insurance provider 210 may combine the set of environment factors (and any subfactors associated therewith) and vehicle factors (and any subfactors associated therewith) to calculate an overall level of risk for the vehicle to experience an animal collision. In some embodiments, the overall level of risk may be a quantitative measurement (e.g., a 10% chance of collision). In other embodiments, the overall level of risk may be a qualitative measurement (e.g., low, medium, high, etc.).

The insurance provider 210 may determine (230) if there is an elevated level of risk for an animal collision based upon the assessment of the risk level. In some embodiments, the insurance provider 210 can compare the calculated overall level of risk to a threshold level of acceptable risk. For example, the threshold level of acceptable risk may be 10% and the calculated level of risk may be 15%. In some cases, the level of risk may be represented by a number or measurement instead of a percentage. In other cases, if the risk levels are qualitative, the insurance provider 210 may deem there to be an elevated risk if the overall level of risk is anything greater than "low." If the insurance provider determines that there is not an elevated level of risk ("NO"), the insurance provider 210 may return to await the arrival of updated vehicle data sent from the vehicle/customer device 206. In contrast, if the insurance provider determines that there is an elevated level of risk ("YES"), the insurance provider 210 may generate (232) a notification indicating that the vehicle is at an elevated risk for an animal collision.

According to embodiments, the generated notification may indicate a particular animal for which the vehicle is at the elevated risk of having a collision. The generated notification may also include information that alerts the vehicle operator to pay extra attention to the possibility that the particular animal may interfere with the path of the vehicle. The generated notification may further include information indicating the source of the elevated risk for an animal collision. For example, the vehicle operator may be driving during deer hunting season and in a known forested hunting range located on the right side of the road. In such an example, the alert may indicate that the vehicle operator should pay extra attention for deer that may enter the roadway from the right side of the road. In some embodiments, in an effort to reduce vehicle operator distraction, the notification may also include an obvious indication that a warning is contained within the notification, such as a flashing yellow triangle.

In some embodiments, the notification may be a text-based warning describing the risks to the vehicle operator. In other embodiments, the notification may be an image indicating that the vehicle is at an elevated risk for an animal collision. In still other embodiments, the notification may be an audio alert capable of dictating the notification to the vehicle operator. Moreover, in the present embodiments, the notification may trigger haptic feedback to the vehicle operator, such as causing the vehicle/customer device 206 to vibrate or causing the steering mechanism of the vehicle to vibrate. The insurance provider 210 may choose to generate a notification capable of utilizing any one medium or combination of media thereof for notification, including but not limited to text, image, audio, or haptic feedback. It is should be appreciated that other techniques for generating a notification, as well as other types of notifications, are envisioned, such as a video, augmented reality elements, and/or the like.

After the insurance provider 210 generates the notification, the insurance provider 210 may communicate (234) the notification to the vehicle/customer device 206. It should be appreciated that various channels of communication for communicating the notification are envisioned, where the channel of communication may vary based upon the type of notification. After receiving the notification, the vehicle/customer device may notify (236) the customer by communicating, annunciating, or otherwise presenting the notification. It should be appreciated that various channels for notifying the customer are envisioned. For example, a text message (SMS) notification may be communicated to the vehicle/customer device 206 via an available cellular network, and the vehicle/customer device 206 may display the SMS notification. In another example, an audio alert may be communicated via a satellite to an antenna coupled with a vehicle infotainment console, and the corresponding vehicle/customer device 206 may notify a vehicle operator by automatically annunciating the audio alert.

Although the notifications are meant to warn vehicle operators of elevated risks for animal collisions before an animal collision occurs, there still may be instances in which vehicles experience animal collisions. If, at some time after the notification is communicated to the vehicle operator, the vehicle collides (238) with an animal ("YES"), the vehicle operator may fill out and transmit (240) an animal collision report to the insurance provider 210. In some cases, the vehicle operator may use the vehicle/customer device 206 (or another device) to fill out and transmit the animal collision report. It should be appreciated that the vehicle operator may use the vehicle/customer device 206 to fill out and transmit an animal collision report even if the vehicle/customer device does not receive a notification. If the vehicle does not collide with an animal ("NO"), then the vehicle/customer device 206 may continue to transmit vehicle data to the insurance provider 210.

The vehicle/customer device 206 may enable the vehicle operator (or another user) to manually input information pertaining to the animal collision. According to the present embodiments, the information may include the date and time of the collision, the location of the collision, the type of animal involved in the collision, and/or any other details or information associated with the animal collision. Further, at least some of the information included in the animal collision report may be generated automatically by the vehicle/customer device 206. In some embodiments, the vehicle operator may choose to supplement the animal collision report with photographs or video of the collision or the area surrounding the collision.

After receiving the animal collision report, the insurance provider 210 may extract any information included in the animal collision report and associate the information with corresponding environment factors or subfactors, and/or any vehicle factors or subfactors. The insurance provider 210 may update (242) the machine learning algorithm according to any extracted information. In particular, the insurance provider 210 may update the specific weights within the machine learning algorithm based upon the extracted data associated with each environment factor or subfactor and/or vehicle factor or subfactor. In some cases, a factor or subfactor included in the animal collision report may be weighted higher after the machine learning algorithm updates the weights. Conversely, a factor or subfactor that was absent from the animal collision report may be weighted less after the machine learning algorithm updates the weights. It should be appreciated that factors or subfactors may exist wherein the absence of the factor or subfactor may weight the factor or subfactor higher and, correspondingly, the weight of the factor or subfactor may be lowered by the factor or subfactor's presence. For example, when updating the weights of the factors or subfactors, if the collision occurred near a dense forest, the machine learning algorithm may adjust the environment factors or subfactors associated with tree density higher. Further, the insurance provider 210 may store the location and date of the animal collision in the database local to the insurance provider 210.

The insurance provider 210 may then pre-populate an insurance claim 243 so that it is easier for the insured customer to complete the insurance claim after the collision with the animal. This may be accomplished by extracting known data about the customer and the insured vehicle from one or more existing databases as well as the environment and collision data received from the vehicle/customer device 206. It should be appreciated that in other embodiments, any of the functionality performed by the insurance provider 210 may be performed by the vehicle/customer device 206 instead.

IV. Exemplary User Interfaces

Figure 3:
FIG. 3 depicts an exemplary alert displayable by a customer device in accordance with some embodiments.

FIG. 3 illustrates an exemplary interface 350 that notifies a customer that the vehicle is at an elevated risk for an animal collision. As discussed herein, a vehicle/customer device may be configured to display the notification, where the notification is received from an insurance provider (or a vehicle control system). As illustrated in FIG. 3, the interface 350 may provide an indication of an alert (i.e., a warning symbol) and a description of the nature of the elevated risk ("A boar collision has occurred in the area recently. Be on alert!"). Although not illustrated in FIG. 3, it should be noted that interface 350 may include additional information associated with the elevated risk, such as a specific direction from which an animal is likely to cross the vehicle's path.

Figure 4:
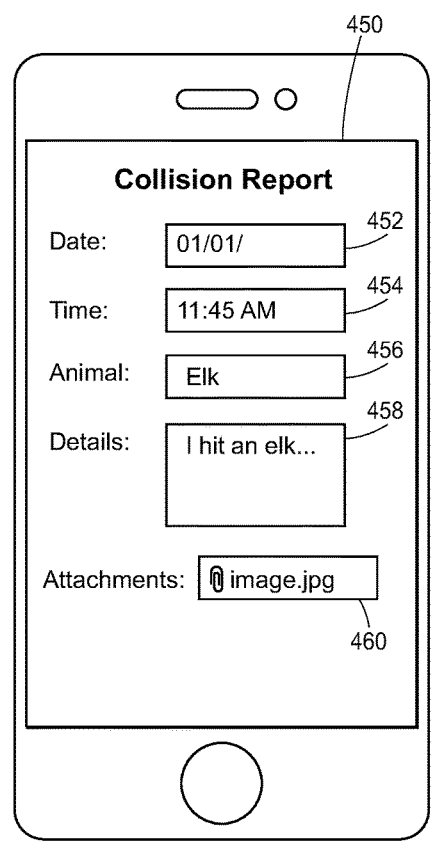
FIG. 4 depicts an exemplary animal collision report form to be transmitted if an animal collision occurs in accordance with some embodiments.

FIG. 4 illustrates an exemplary interface 450 indicating an example animal collision report form. According to the present embodiments, the interface 450 may include selections, input boxes, or the like that enable the user to input data associated with an animal collision. As illustrated in FIG. 4, the data may include a date 452 ("01/01"), a time 454 ("11:45 am"), a type of animal ("Elk") 456, and other details about the collision 458 ("I hit an elk . . . "). At least some of this information may be automatically prepopulated by the vehicle/customer device. Although not illustrated in FIG. 4, manually entered or automatically generated location data may also be included in an animal collision report. Some embodiments may also enable a user to attach images 460 (img01.jpg) or videos to the animal collision report. The images or videos may be taken by mobile devices associated with the operator, and/or by vehicle mounted cameras.

Figure 5A:
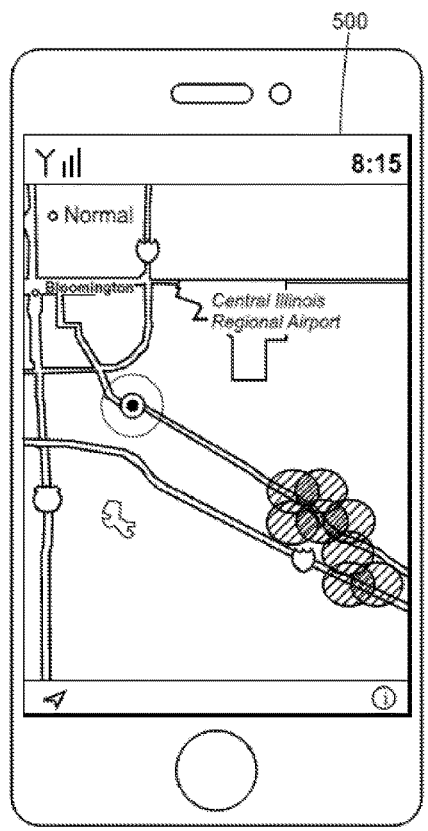
FIG. 5A depicts an exemplary user interface for displaying high-risk areas on a virtual road map in accordance with some embodiments.

FIG. 5A illustrates an exemplary interface 500 for displaying high-risk areas on a virtual road map. Although FIG. 5A depicts a smart phone displaying the interface 500, it should be appreciated that the interface 500 may be displayed on any electronic device capable of executing a collision risk application (such as a mobile device, smart vehicle display, vehicle navigation unit, and/or other computing devices). The interface 500 may depict a virtual road map covering a geographical area in which a vehicle is currently located. The interface 500 may further depict a virtual representation of the current location of the vehicle (e.g., GPS location) superimposed on the virtual road map (the solid circle represents the current vehicle location). It should be appreciated that as the current location of the vehicle changes, the virtual representation of the current location may be superimposed on the virtual road map in a new location representative of the new current location.

In addition to the virtual representation of the current location of the vehicle, the interface 500 may depict a plurality of virtual representations corresponding to a plurality of high-risk areas and/or danger zones. In some cases, the plurality of high-risk areas correspond to a plurality of locations in which a prior vehicle collision occurred. In some further cases, the plurality of locations in which a prior vehicle collision occurred only includes those prior vehicle collisions that occurred within a temporal scope of the current time and/or day (e.g., a similar time of day and/or similar day of year). The visual representation corresponding to the plurality of high-risk areas may be a circle centered at the location in which the prior vehicle collision occurred. The circle may be centered at a location of the prior vehicle collision and extend to a radius of a threshold distance (such as 1-2 miles, 200-300 yards, 2-3 city blocks, etc.). It should be appreciated that, as illustrated in FIG. 5A, the visual representations corresponding to each of the plurality of high-risk areas may overlap.

Figure 5B:
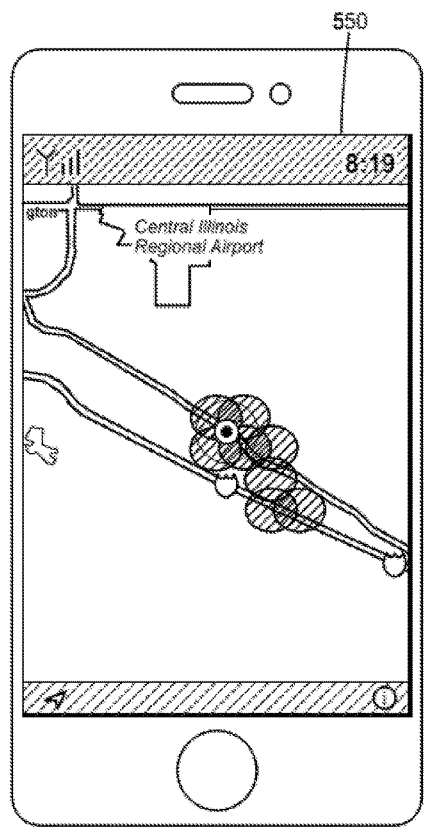
FIG. 5B depicts an exemplary user interface for warning a driver that their current location is within a high-risk area in accordance with some embodiments.

FIG. 5B illustrates an exemplary interface 550 for warning a driver of a vehicle that their current location is within a high-risk area. Although FIG. 5B depicts a smart phone displaying the interface 550, it should be appreciated that the interface 550 may be displayed on any electronic device capable of executing a collision risk application. The interface 550 may be displayed in response to determining that the current location of the vehicle is within a threshold distance of a high-risk area. The interface 550 may display this scenario by superimposing, on the virtual road map, the visual representation for the current location of the vehicle within a circular visual representation corresponding to a high-risk area.

The interface 550 may also depict a visual alert and/or warning that the location of the vehicle is within a high-risk area. As depicted in FIG. 5B, the visual alert may be a changing of the color in a displayed border region of the interface 550. In other embodiments, the visual warning may include a visual and/or iconographic warning similar to the visual warning depicted in the interface 350 as described with respect to FIG. 3. Although FIGS. 3 and 5B depict exemplary visual alerts that the vehicle is located within a high-risk area, it is envisioned that any method known in the art for providing a visual alert that a vehicle is within a high-risk area may be implemented.

Figure 6A:
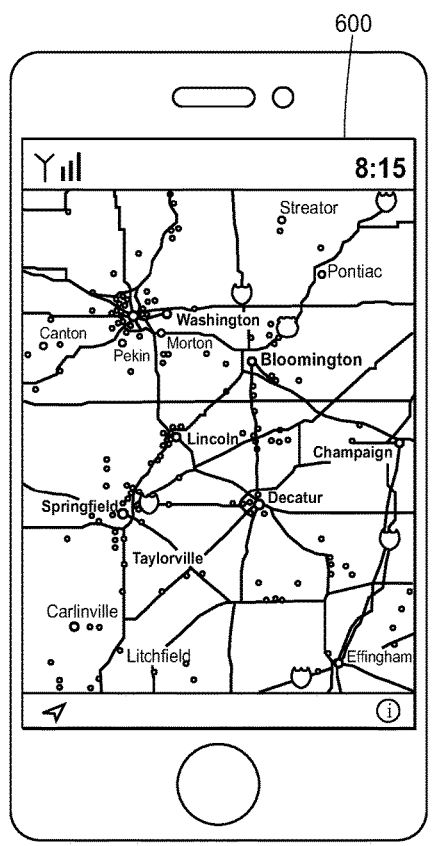
FIG. 6A depicts an exemplary user interface for displaying high-risk areas on a virtual road map at a different zoom level than the exemplary user interface of FIG. 5A, in accordance with some embodiments.

FIG. 6A illustrates an exemplary interface 600 for displaying high-risk areas on a virtual road map at a different zoom level than the exemplary interface 500 of FIG. 5A. Although FIG. 6A depicts a smart phone displaying the interface 600, it should be appreciated that the interface 600 may be displayed on any electronic device capable of executing a collision risk application. Similar to the interface 500 of FIG. 5A, the interface 600 may also depict a virtual road map, a visual representation of a current location of the vehicle, and a plurality of visual representations corresponding to high-risk areas and/or danger zones. However, as compared to the interface 500 of FIG. 5A, the virtual road map is depicted at a lower zoom level (i.e., zoomed out). Accordingly, in the interface 600, while the threshold distance associated with a particular high-risk area may be the same as in the interface 500 of FIG. 5a, due to the zoom level, the illustrated radius of the threshold distance is smaller. In some embodiments, an interface displayed on the electronic device, such as any of the interfaces 500-650, may provide interface elements that enable a driver of the vehicle to change the zoom level (e.g., icons, sliders, the ability to detect a gesture or voice commands, etc.).

It should be appreciated that in some embodiments, when the zoom level of the virtual road map is sufficiently zoomed in, a virtual representation corresponding to each high-risk area may be displayed (provided that the location is located within the displayed geographic region). To avoid providing too much detail to the driver, as the zoom level adjusts further out, several of the individual virtual representations for high-risk areas may be combined into a single virtual representation. Conversely, when the zoom level adjusts back in, a single virtual representation may split into several individual virtual representations. Since a larger geographic area may be displayed on the virtual map in response to zooming out, the collision risk application may access additional data detailing a plurality high risk areas located within the newly displayed geographic regions and, subsequently, display virtual representations corresponding to the additional plurality of high risk areas.

Figure 6B:
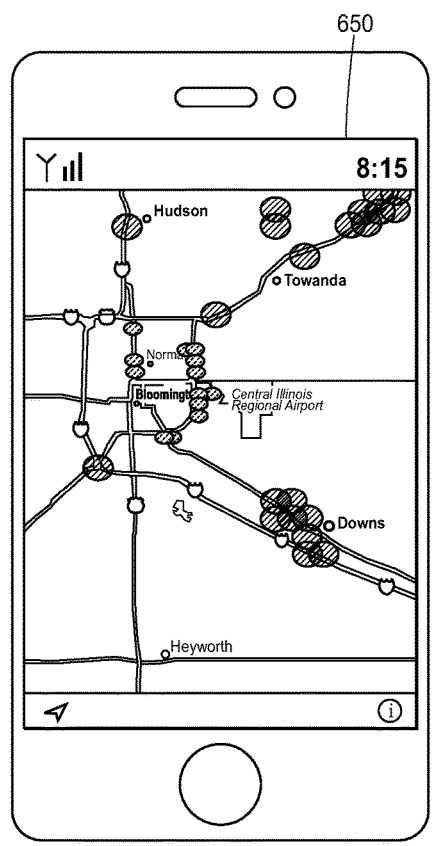
FIG. 6B depicts an exemplary user interface for displaying multiple types of high-risk areas on a virtual road map in accordance with some embodiments.

FIG. 6B illustrates an exemplary interface 650 for displaying multiple types of high-risk areas on a virtual road map. Although FIG. 6B depicts a smart phone displaying the interface 650, it should be appreciated that the interface 650 may be displayed on any electronic device (e.g., mobile device, vehicle display, vehicle navigation unit, etc.) capable of executing a collision risk application. As depicted in the interface 650, the plurality of virtual representations corresponding to high-risk areas are displayed in two different colors. According to some embodiments, virtual representations displayed in a first color correspond to vehicle-animal collisions and virtual representations displayed in a second color correspond to vehicle-vehicle collisions. It should be appreciated that any number of colors or other indications may be used to organize the plurality of high-risk areas based upon the corresponding type of collision. In an embodiment, car-deer collisions may be displayed in one color and car-raccoon collision in other. In other embodiments, car-deer collisions may be represented by a deer-head icon and car-raccoon collisions by a raccoon-paw icon.

Figure 7:
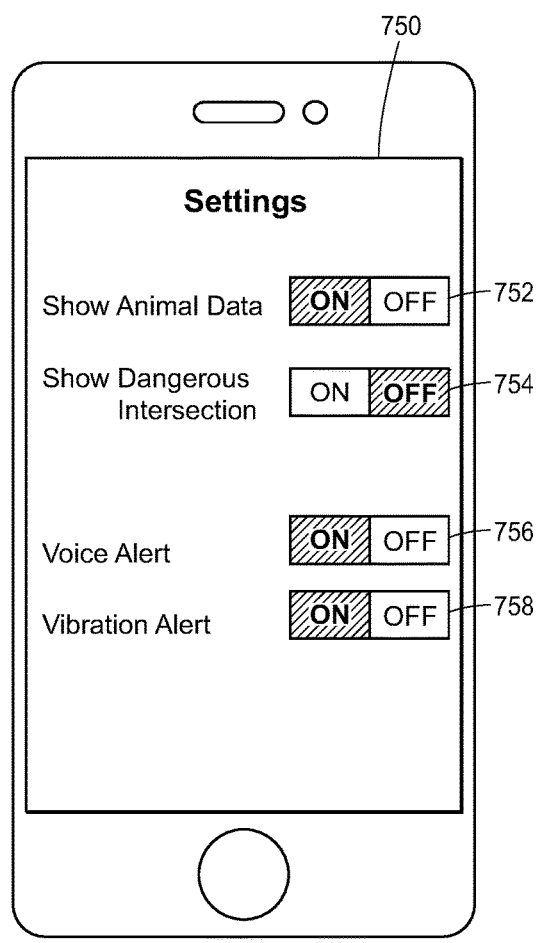
FIG. 7 depicts an exemplary user interface for modifying the operation of a collision risk application in accordance with some embodiments.

FIG. 7 illustrates an exemplary interface 700 for depicts an exemplary user interface for modifying the operation of a collision risk application. Although FIG. 7 depicts a smart phone displaying the interface 700, it should be appreciated that the interface 700 may be displayed on any electronic device capable of executing the collision risk application. Although not illustrated, it should be appreciated that any of the interfaces 500-650 may also include an interface element (e.g., a settings icon) that, in response to receiving an indication of its selection, causes the electronic device to display the interface 700. In such scenarios, the user interface displaying the virtual road map (such as any of the interfaces 500-650) may be considered the primary interface, and the interface 700 may be considered the secondary interface.

According to the present embodiments, the interface 700 may include user interface elements that enable the driver of the vehicle to modify the operation of the collision risk application. As illustrated in FIG. 7, the operational parameters that may be modified to include parameters pertaining to the display of information, such as displaying virtual representations corresponding to vehicle-animal collision 752 ("Show Animal Data"), and displaying virtual representations corresponding to vehicle-vehicle collision 754 ("Show Dangerous Intersections"). It should be appreciated that if the animal data option 752 is enabled and the dangerous intersection option 754 is disabled, upon returning to the primary interface, the electronic device may only display virtual representations representative of high-risk areas corresponding to vehicle-animal collisions. In such a scenario, the electronic device may not display the plurality of virtual representations representative of high-risk areas corresponding to vehicle-vehicle collisions.

Other operational parameters that may be modified may include parameters pertaining to alerting and/or warning the driver of the vehicle that the vehicle is in a high-risk area, such as whether the warning should include an audio alert 756 ("Voice Alert") and whether the warning should include a haptic alert 758 ("Vibration Alert"). It should be appreciated that the displayed user interface elements are exemplary and additional, fewer or alternative parameters controlling the operation of the collision risk application may be controlled by the interface 700.

In some further embodiments, the electronic device may detect that, via the interface 700, the driver has disabled some or all of the displayed high-risk areas. In response, the electronic device may generate and transmit a notification to an insurance provider associated with the driver and/or the vehicle indicating the disabling of the displayed high-risk areas. After receiving the notification, the insurance provider may then perform an insurance-related action, including adjusting an insurance policy, rate, premium and/or discount. Similarly, the electronic device may detect, via the interface 700, that the driver has enabled/re-enabled the display of some or all of the high-risk areas. In response, the electronic device may generate and transmit to the insurance provider a second notification indicating that the driver has enabled the display of the high-risk areas. After receiving the second notification, the insurance may then perform a second insurance-related action.

V. Exemplary Method of Risk Assessment

Figure 8:
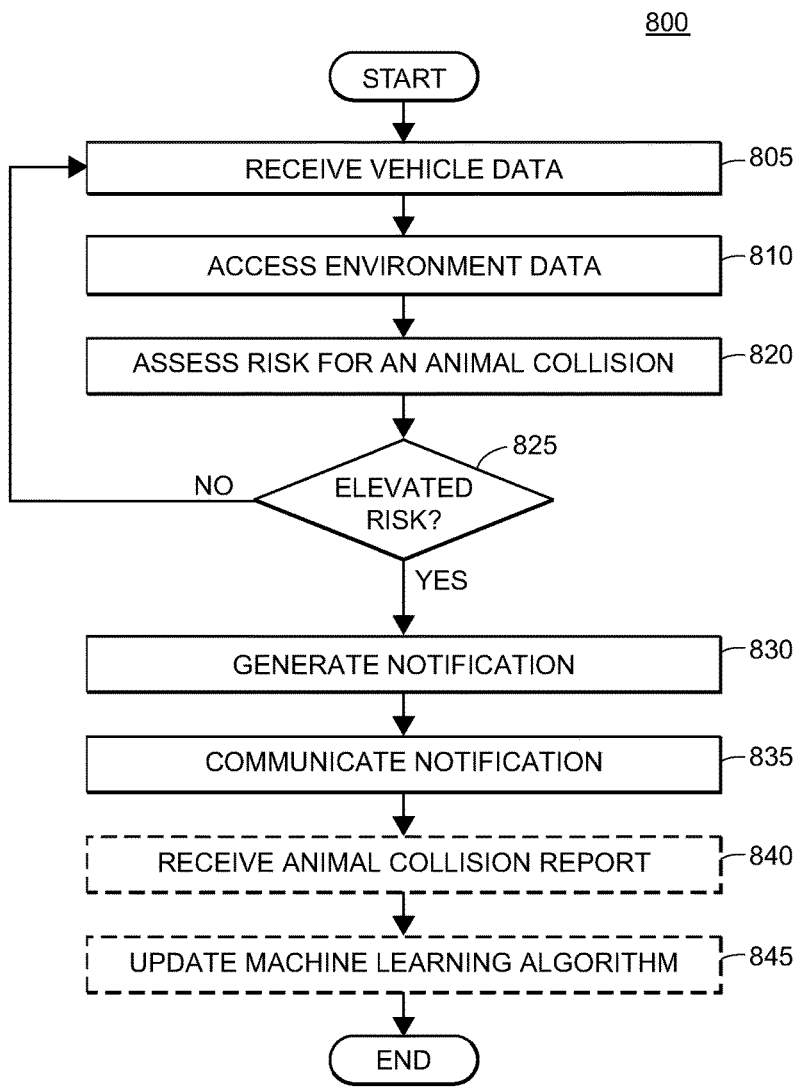
FIG. 8 depicts a flow diagram associated with an insurance provider for determining and communicating that a vehicle is at an elevated risk for an animal collision in accordance with some embodiments.

Referring to FIG. 8, depicted is a block diagram of an exemplary method 800 for assessing a risk for an animal collision and communicating a notification of the elevated risk. The method 800 may be facilitated between the insurance provider 110 as depicted in FIG. 1 and a customer associated with the vehicle. The customer may use any type of electronic or computing device (such as the electronic device 106 as depicted in FIG. 1, and/or a smart vehicle controller associated with the vehicle 105) to provide vehicle data, receive a notification, and/or transmit an animal collision report.

The insurance provider may receive, from the customer, vehicle data associated with the vehicle including at least information indicting the vehicle's location (block 805). The vehicle data may additionally include various vehicle factors and subfactors that may impact the vehicle's risk for an animal collision. Based upon at least the location of the vehicle, the insurance provider may access environment data associated with the location as well as any other relevant data included in the received vehicle data (block 810). The environment data may include a plurality of environment factors and subfactors that may impact the vehicle's risk for an animal collision. The insurance provider may assess the overall level of risk of the vehicle for an animal collision based upon the plurality of vehicle factors and subfactors and/or the environment factors and subfactors (block 820). In the present embodiments, the insurance provider may assess the overall level of risk according to one or more machine learning algorithms, whereby the machine learning algorithms can assign weights to any vehicle factors or subfactors and/or any environment factors and/or subfactors.

The insurance provider may then determine whether there is an elevated risk for an animal collision, such as by determining whether the overall level of risk exceeds a threshold value (block 825). The threshold value may represent the maximum level of risk that an insurance provider is willing to take on without notifying the customer. If the insurance provider determines there is not an elevated risk for an animal collision ("NO"), processing may return to block 805 or proceed to other functionality. If the insurance provider determines that there is an elevated risk for an animal collision ("YES"), processing may proceed with the insurance provider generating a notification that indicates an elevated risk for an animal collision (block 830). The insurance provider may subsequently communicate the notification to the customer (block 835). As discussed herein, the insurance provider may utilize a plurality of communication channels for communicating the notification, such as to either a mobile device associated with the vehicle driver or to a control or communications system of the vehicle.

Subsequent to the insurance provider communicating the notification, there still may be a situation in which the vehicle collides with an animal. In this case, the customer may fill out an animal collision report and communicate the animal collision report to the insurance provider. Accordingly, the insurance provider may receive the animal collision report from the customer (block 840). If an animal collision report is received, the insurance provider may update the machine learning algorithm based upon the details of the animal collision report (block 845). In particular, the insurance provider may update any weights associated with any vehicle factors and subfactors, and/or environment (including geographical, road, weather, visibility, time-related, and/or other) factors and subfactors, that are present or absent in the animal collision report. It should be appreciated that any number of the actions associated with the method 800 may be performed by the electronic device and/or smart vehicle controller instead of the insurance provider.

VI. Exemplary Method of Alerting a Driver

Figure 9:
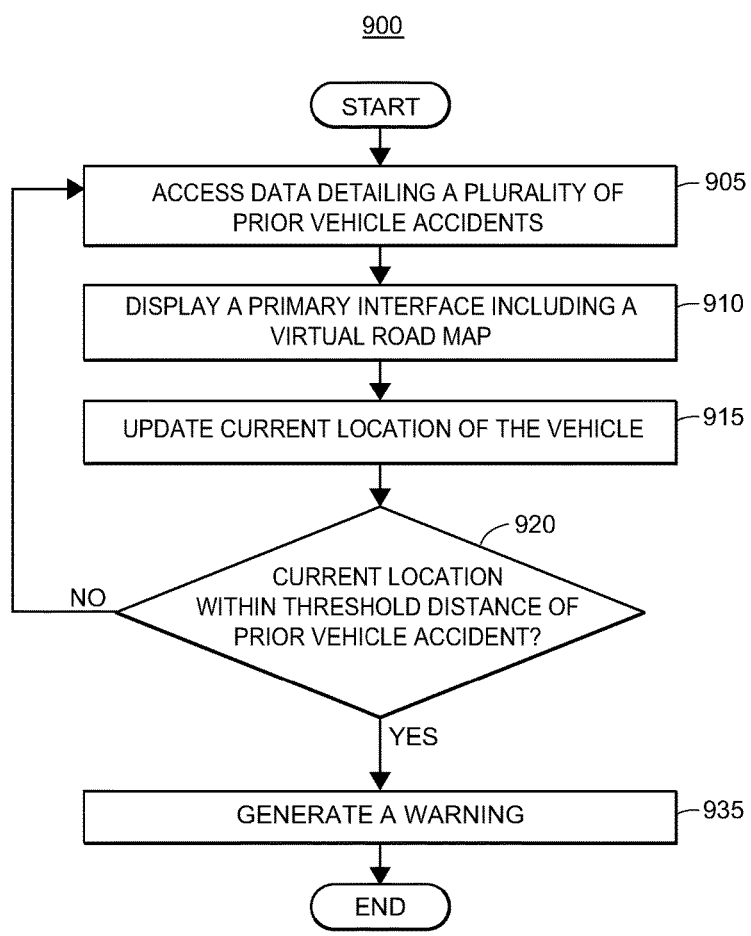
FIG. 9 depicts a flow diagram associated with an electronic device for warning a driver of a vehicle that the current location of the vehicle is within a high-risk area in accordance with some embodiments.

Referring to FIG. 9, depicted is a block diagram of an exemplary method 900 for warning a driver of a vehicle that the current location of the vehicle is within a high-risk area. The method 900 may be facilitated between the electronic device 106 as depicted in FIG. 1, and/or a smart vehicle controller associated with the vehicle 105 as depicted in FIG. 1 (collectively "the electronic device") with the insurance provider 110 as depicted in FIG. 1.

Prior to the commencement of the method 900, the driver may launch a collision risk application on the electronic device. In some cases, the collision risk application may run as a background process on the electronic device. Once launched, the collision risk application may display a virtual road map representative of a particular geographical region. The electronic device may then access data detailing of high-risk areas within the displayed geographical region, including a plurality of prior vehicle accident data (block 905). It should be appreciated that in some embodiments, the high-risk areas may also be identified based upon environment factors as determined through the use of a machine learning algorithm, as described elsewhere herein. Additionally or alternatively, the data detailing high risk areas of animal-vehicle and/or vehicle-vehicle collisions/accidents may be built from one or more data sources. The data sources may include historical data, vehicle accident data, DMV data, insurance claim data, police report data, user entered data (such as insurance customers voluntarily entering data about animal-vehicle or vehicle-vehicle collisions via their mobile such that vehicle accidents in the future may be prevented), and/or other sources of accident data.

In order to quickly display relevant high-risk areas, the electronic device may access data indicating high-risk areas in a geographic region proximate to the displayed geographic region. In cases in which the collision risk application is running as a background process, the electronic device may access data detailing high-risk areas within a default radius or distance of the vehicle's current location. In some embodiments, the size of this "pre-accessed" proximate geographical region and/or default radius may vary based upon a detected speed of the vehicle.

In addition to geographical filtering, the electronic device may only access data detailing high-risk areas within a particular temporal scope. The temporal scope may include a time of day and/or a day of year. As an example, if the current time is in the 10:00 P.M. range, the electronic device may only access data detailing an accident that occurred at night (e.g., 8:00 P.M.-5:00 A.M.). Similarly, if the current day is November 17, the electronic device may only access data detailing an accident that occurred in the same "season" (e.g., November 1-December 31). In some embodiments, in order to prevent providing too much information to the driver, the electronic device may only access data detailing accidents that occurred within the most recent year or years, such as 3-5 years.

After accessing data detailing high-risk areas within both a geographic and temporal scope, the electronic device may display a primary interface that includes a depiction of the virtual road map, a virtual representation of the vehicle's current (e.g., GPS) location and a plurality of virtual representations corresponding to the accessed high-risk area data (block 910). Each virtual representation corresponding to the accessed high-risk area data may be superimposed on the virtual road map at a location representative of the latitude and longitude of the high-risk area, such as at a location where a prior vehicle accident occurred.

As described elsewhere herein, the virtual representations corresponding to the plurality of accessed high-risk area data may be divided into two or more sets of particular types of vehicle accidents. For example, one set of high-risk area data may correspond to vehicle-animal collisions, and another set of high-risk area data may correspond to vehicle-vehicle collisions. Accordingly, the virtual representations corresponding to each set of vehicle accident types may be displayed within a different color and/or icon.

When the vehicle moves to a new location, the electronic device may detect that the current location of the vehicle has changed. In response, the electronic device may update the location on the displayed virtual road map in which the virtual representation of the vehicle's current location is displayed (block 915). As the electronic device detects that the current location of the vehicle has been updated (i.e., the vehicle is moving or traveling along a road), it may determine whether the updated current location is within a threshold distance of a high-risk area, including a location where a prior vehicle accident occurred (block 920). The electronic device may calculate a distance between the latitude and longitude corresponding to the updated current location and the respective latitudes and longitudes corresponding to each of the plurality of accessed high-risk areas. If none of the calculated distances are less than a threshold value ("NO"), then the electronic device may return to block 905 to continue accessing new prior vehicle accident data relevant to the updated current location.

If at least one of the calculated distances is less than the threshold value ("YES"), then the electronic device may generate a warning to alert the driver that the vehicle is currently located in and/or approaching a high-risk area (block 935). The generated warning may include any combination of visual, audible, and haptic alerts and/or warnings. For visual warnings, the electronic device may display text indicating the high risk and/or change the color of a portion of the displayed interface to indicated the presence of the high risk. For audible warnings, the electronic device may generate and emit an alert tone and/or recite generated speech detailing the high risk. For haptic feedback, the electronic device may cause the device itself or a portion of the vehicle (or display) to vibrate. It should be appreciated that once the updated current location is no longer within a high-risk area, the electronic device may cease any ongoing alerts and/or warnings, and return to block 905. It should be further appreciated that the method 900 may include additional, fewer, or alternative actions associated with each block, including those described elsewhere herein.

VII. Exemplary Method of Processing Collision Risk

In one aspect, a computer-implemented method of processing vehicle collision risk information may be provided. The method may include: (1) receiving, at a hardware server, vehicle data indicating at least a location of a vehicle; (2) accessing, by a processor, environment data associated with the location of the vehicle; (3) based upon the environment data, determining, by the processor, that the vehicle is at an elevated risk for an animal collision; (4) generating, by the processor, a notification indicating the elevated risk; and/or (5) communicating, via a communications network, the notification to the vehicle.

Communicating the notification to the vehicle may include communicating the notification to at least one of an onboard computer of the vehicle and an electronic device associated with an operator of the vehicle. Receiving the vehicle data may include receiving at least one of a speed of the vehicle, vehicle characteristics, and demographic information associated with an operator of the vehicle. Accessing the environment data may include accessing at least one of: a historical record of accidents, ecological characteristics, and/or roadway characteristics. Determining that the vehicle is at the elevated risk may include determining, from the environment data, that a previous accident has occurred at or near the location of the vehicle. The environment data may include a first environment factor having a first specific weight and a second environment factor having a second specific weight, and determining that the vehicle is at an elevated risk may include calculating an overall risk based upon combining the first environment factor and the second environment factor.

Determining that the vehicle is at the elevated risk may include (1) identifying at least one of a time of day and a time of year; and (2) determining, from a portion of the environment data corresponding to the at least one of the time of day and the time of year, that the vehicle is at the elevated risk. The method may further include receiving, at the hardware server, an animal collision report indicating that the vehicle collided with an animal. Determining that the vehicle is at the elevated risk includes executing a machine learning algorithm. The method may also include updating the machine learning algorithm according to the animal collision report. The method may include additional, fewer, or alternate actions, including those discussed elsewhere herein.

VIII. Exemplary System for Processing Collision Risk

In one aspect, a system for processing vehicle collision risk information may be provided. The system may include (1) a communication module adapted to communicate data; (2) a memory adapted to store non-transitory computer executable instructions; (3) a hardware server to store environment data; and/or (4) a processor adapted to interface with the communication module. The processor may be configured to execute the non-transitory computer executable instructions to cause the processor to: (a) receive, via the communication module, vehicle data indicating at least a location of a vehicle, (b) access, via the processor, at least a portion of the environment data associated with the location of the vehicle, (c) based upon the environment data, determine, via the processor, that the vehicle is at an elevated risk for an animal collision, (d) generate, via the processor, a notification indicating the elevated risk, and (e) communicate, via the communication module, the notification to the vehicle.

To communicate the notification to the vehicle, the communication module may be configured to: communicate the notification to at least one of an onboard computer of the vehicle and an electronic device associated with an operator of the vehicle. To receive the vehicle data, the hardware server may be configured to: receive at least one of a speed of the vehicle, vehicle characteristics, the location of the vehicle, and demographic information associated with an operator of the vehicle. To facilitate accessing the environment data, the processor may be configured to execute the non-transitory computer executable instructions to cause the processor to access at least one of: a historical record of accidents, ecological characteristics, and roadway characteristics. To facilitate determining that the vehicle is at the elevated risk, the processor is configured to determine, from the environment data, that a previous accident has occurred at or near the location of the vehicle. The environment data may include a first environment factor associated with a specific weight and a second environment factor associated with a specific weight, and wherein determining that the vehicle is at an elevated risk may include calculating, via the processor, an overall risk based upon combining the first environment factor and the second environment factor.

To facilitate determining that the vehicle is at the elevated risk, the processor may be configured to identify at least one of a time of day and a time of year; and determine, from a portion of the environment data corresponding to the at least one of the time of day and the time of year, that the vehicle is at the elevated risk. The processor may be further configured to receive an animal collision report indicating that the vehicle collided with an animal. To facilitate determining that the vehicle is at the elevated risk the processor may be configured to execute a machine learning algorithm. The processor may be further configured to update the machine learning algorithm according to the animal collision report. The system may include additional, less, or alternate components and functionality, including that discussed elsewhere herein.

IX. Exemplary Computer-Implemented Methods

In one aspect, a computer-implemented method of avoiding or reducing the likelihood of a vehicle-animal collision may be provided. The method may include (a) identifying high risk areas of vehicle-animal collision, the high risk areas being identified based upon one or more of: (1) location, (2) time of day, and (3) day of year; (b) monitoring or otherwise identifying a location of a mobile device; and/or (c) when a current location of the mobile device matches the location of the high risk area, if the current time of day and current day of year match the time of day and day of year associated with the high risk area, causing the mobile device to issue an alert or warning to the user. Additionally or alternatively, other characteristics associated with the high risk area may be matched or compared. The method may include additional, fewer, or alternate actions, including those discussed elsewhere herein.

In another aspect, a computer-implemented method of avoiding a vehicle-animal collision may be provided. The method may include (a) identifying high risk areas of vehicle-animal collision; (b) monitoring or identifying a location of a mobile device; and/or (c) when a current location of the mobile device is approaching the high risk area, if one or more other parameters associated with the high risk area match, causing the mobile device to issue an alert or warning to the user. The one or more other parameters associated with the high risk area that may be matched to cause an alert or warning to issue may be associated with time of day; day of year; weather; harvest; field; geography; wildlife preserve; animal-related information (such as animal movement or mating information); and/or other information discussed elsewhere herein. The method may include additional, fewer, or alternate actions, including those discussed elsewhere herein.

In another aspect, a computer-implemented method of issuing an alert associated with a vehicle-animal collision may be provided. The method may include (i) predicting a (1) geographical scope, and (2) a temporal scope of an area at high risk of being associated with a vehicle-animal collision; (ii) monitoring or identifying a current location of a mobile device; (iii) monitoring or identifying a current time; and/or (iv) when (a) the current location of the mobile device matches or falls within the geographical scope of the area at high risk, and/or (b) the current time matches or falls within the temporal scope of the area at high risk, causing the mobile device to issue an alert to the user. The geographical scope may include or be associated with an area defined by latitude/longitude coordinates, mile markers on a stretch of highway, county lines, distance information, etc. The geographical scope may also be associated with terrain information (hills, forest, open land, farm land, prairie, river, creek, field, and/or other geographical-related characteristics). For example, the terrain information may facilitate defining the size or physical boundaries of the geographical scope of the high risk area. The temporal scope may include or be associated with time of day, seasonal, day of month, day of year, month, and/or other time-related information. The method may include additional, fewer, or alternate actions, including those discussed elsewhere herein.

In another aspect, a computer-implemented method of issuing an alert associated with a likelihood of a vehicle-animal collision may be provided. The method may include, via one or more processors, (i) predicting (1) a geographical scope, (2) a temporal scope, and/or (3) a seasonal scope of an area at high risk of being associated with a vehicle-animal collision; (ii) monitoring or identifying a current location of a mobile device; (iii) monitoring or identifying a current time of day; (iv) monitoring or identifying a current time of year; and/or (v) when (a) the current location of the mobile device matches or falls within the geographical scope of the area at high risk, (b) the current time matches, falls within, or coincides with the temporal scope of the area at high risk, and/or (c) the current time of year matches, falls within, or coincides with the seasonal scope of the area at high risk causing the mobile device to issue an alert to the user. The temporal scope may include or be associated with, for example, time of day, day/night, sunrise/sunset, dusk/dawn, and other information. The seasonal scope may include or be associated with month or spring, summer, fall, and winter information; harvest/planting information; weather information, and/or other information. Other characteristics of the area at high risk of being associated with a vehicle-animal collision, such as those discussed elsewhere herein, may also be matched or compared to current conditions to further enhance the accuracy of the alert being issued.

Predicting (1) the geographical scope, (2) the temporal scope, and (3) the seasonal scope of the area at high risk of being associated with a vehicle-animal collision may include analyzing a database of actual vehicle collisions involving vehicles and animals. Alternatively or additionally, predicting the area at high risk of being associated with a vehicle-animal collision further comprises analyzing automobile accidents, driver characteristics, animal tendencies, weather, calendar, time of day, geographical information. The method may further include (a) the processor determining whether or not the vehicle is moving before issuing the alert or warning, and/or (b) include adjusting an insurance premium, discounts, or reward based upon animal collision avoidance functionality. The method may include additional, fewer, or alternate actions, including those discussed elsewhere herein.

In another aspect, a computer-implemented method of issuing an alert associated with a likelihood of a vehicle-animal collision occurring may be provided. The method may include (i) creating a database of high risk areas where vehicle-animal collision are likely to occur, the high risk areas may comprise or be defined by (1) a geographical scope, (2) a temporal scope, and/or (3) a seasonal scope associated with an area at high risk of being associated with a vehicle-animal collision; and/or (ii) when (a) the current location of the mobile device approaches or falls within the geographical scope of a high risk area, (b) the current time coincides with the temporal scope of the high risk area, and/or (c) the current time of year coincides with the seasonal scope of the high risk area causing the mobile device to issue an alert or warning to the user. Other characteristics of the high risk area may also be compared to current conditions in determining whether to issue an alert. The alert or warning may be an audible, visual, vibrational, haptic, or other type of alert. As an example, the frequency that a light flashes or a sound beeps, or the audible level of the beep, may be dependent on the level of the likelihood of a vehicle-animal collision occurring. The method may include additional, fewer, or alternate actions, including those discussed elsewhere herein.

The methods discussed above and herein may further include taking insurance-related actions based upon the collision avoidance functionality detailed herein. The method may include adjusting insurance rates, premiums, discounts, and/or rewards. For instance, the remote server associated with an insurance provider that may generate collision avoidance alerts or warnings may also calculate customer-specific insurance premiums, rates, rewards, points, discounts, and/or other customer-specific items. The customer-specific insurance-related items may be calculated based upon the amount and/or type of animal collision functionality that a customer's mobile device or vehicle is equipped with.

The amount or percentage of time that a vehicle operator employs animal collision avoidance functionality may be determined from vehicle usage data collected (with the vehicle operator's permission). The customer-specific insurance-related items, such as premiums or discounts, may be adjusted according to the percentage of time that the vehicle is operated with the collision avoidance functionality being used. For instance, if an insured operates a vehicle with animal collision avoidance functionality employed for all or a substantial amount of the time, that insured may receive a discount, or reward from the insurance provider.

X. Exemplary Mobile Devices

In one aspect, a mobile device configured to facilitate the avoidance of a vehicle-animal collision may be provided. The mobile device may include a memory storing information associated with high risk areas of vehicle-animal collision; and/or a processor configured to: (a) monitor or identify a GPS location of the mobile device; (b) determine that the mobile device is within a moving vehicle (such as via speed sensor, or monitoring speed of movement via GPS coordinates); and/or (c) predict or identify that the mobile device is within or approaching a high risk area based upon at least the GPS location of the mobile device. When the processor determines that the mobile device is (1) within a moving vehicle, (2) is within or approaching a high risk area, and/or (3) verifies at least one additional current condition corresponds to a characteristic of the high risk area (such as time of day; day of year; geography; weather; traffic; or other characteristics discussed herein), the mobile device may issue an alert or warning to the user to indicate that the vehicle is within or approaching an area of high risk of vehicle-animal collision. The mobile device may include additional, fewer, or alternate functionality, including that discussed elsewhere herein.

In another aspect, a mobile device (or smart vehicle communications and control system) configured to issue an alert associated with the likelihood of a vehicle-animal collision may be provided. The mobile device (or smart vehicle communications and control system) may include (i) a memory storing a database of high risk areas where vehicle-animal collision are likely to occur, the high risk areas being defined in the memory by at least fields related to (1) a geographical scope, (2) a temporal scope, and/or (3) a seasonal scope of an area at high risk of being associated with a vehicle-animal collision; and/or (ii) a processor configured to issue an alert or warning to the user when (a) the current location of the mobile device (or smart vehicle communications and control system) approaches or falls within the geographical scope of a high risk area, (b) the current time coincides with the temporal scope of the high risk area, and/or (c) the current time of year coincides with the seasonal scope of the high risk area. The mobile device (or smart vehicle communications and control system) may include additional, fewer, or alternate functionality, including that discussed elsewhere herein.

In another aspect, a mobile device (or smart vehicle communications and control system) configured to issue an alert associated with the likelihood of a vehicle-animal collision occurring may be provided. The mobile device (or smart vehicle communications and control system) may include (i) a processor configured to monitor or otherwise identify a current location of the mobile device (or smart vehicle communications and control system); (ii) a transceiver configured to transmit the current location of the mobile device (or smart vehicle communications and control system) to a remote server or processor; (iii) the transceiver further configured to receive a high risk message from the remote server or processor indicating the mobile device (or smart vehicle mounted communications and control system, i.e., the vehicle) is approaching or within an area at high risk of vehicle-animal collision; and/or (iv) when a high risk message is received by the transceiver at the mobile device (or smart vehicle communications and control system), the processor directs the mobile device (or smart vehicle communications and control system) to issue an alert or warning to the user indicative that the user is about to or has entered the area at high risk of vehicle-animal collision. The mobile device (or smart vehicle communications and control system) may include additional, fewer, or alternate functionality, including that discussed elsewhere herein.

XI. Exemplary Collision Avoidance Functionality

In one aspect, a mobile device configured to facilitate the avoidance of, or reducing the likelihood of, a vehicle-animal collision may be provided. The mobile device may include a means for storing information associated with high risk areas of vehicle-animal collision; and/or (a) means for monitoring or identifying a GPS location of the mobile device; (b) means for determining that the mobile device is within a moving vehicle (such as via speed sensor, or monitoring speed of movement via GPS coordinates); and/or (c) means for identifying that the mobile device is within or approaching a high risk area based upon at least the GPS location of the mobile device. When the mobile device determines that the mobile device is (1) within a moving vehicle, (2) is within or approaching a high risk area, and/or (3) verifies at least one additional current condition corresponds to a characteristic of the high risk area (such as time of day; day of year; geography, weather; traffic; or other characteristics discussed herein), the mobile device activates a means for issuing an alert or warning to the user to indicate that the vehicle is within or approaching an area of high risk of vehicle-animal collision. The mobile device may include one or more processors, memory units, a combination of processor(s) and memory unit(s), applications, non-transitory computer instructions, and/or other components that provide for or implement the "means for" functionality noted above. The mobile device may include additional, fewer, or alternate functionality, including that discussed elsewhere herein.

In another aspect, a mobile device (or smart vehicle communications and control system) configured to issue an alert associated with the likelihood of a vehicle-animal collision may be provided. The mobile device (or smart vehicle system) may include (i) means for storing high risk areas where vehicle-animal collision are likely to occur, the high risk areas may be defined by (1) a geographical scope, (2) a temporal scope, and/or (3) a seasonal scope of an area at high risk of being associated with a vehicle-animal collision; and (ii) means for issuing an alert or warning to the user when (a) the current location of the mobile device (or smart vehicle) approaches or falls within the geographical scope of a high risk area, (b) the current time coincides with the temporal scope of the high risk area, and/or (c) the current time of year coincides with the seasonal scope of the high risk area. The mobile device (or smart vehicle system) may include means for comparing current mobile device (or smart vehicle) conditions with characteristics associated with the high risk areas. The mobile device (or smart vehicle system) may include one or more processors, memory units, a combination of processor(s) and memory unit(s), applications, non-transitory computer instructions, and/or other components that provide for or implement the "means for" functionality noted above. The mobile device (or smart vehicle system) may include additional, fewer, or alternate functionality, including that discussed elsewhere herein.

In another aspect, a mobile device (or smart vehicle system) configured to issue an alert associated with the likelihood of a vehicle-animal collision occurring may be provided. The mobile device (or smart vehicle system) may include (i) means for monitoring a current location of the mobile device (or smart vehicle); (ii) transmitting means for wirelessly transmitting the current location of the mobile device (or smart vehicle) to a remote server or processor; (iii) receiving means for wirelessly receiving a high risk message from the remote server or processor indicating the mobile device (or smart vehicle) is approaching or within an area at high risk of vehicle-animal collision; and/or (iv) when a high risk message is received by the transceiver at the mobile device (or smart vehicle system), means for directing the mobile device (or smart vehicle system) to issue an alert or warning to the user indicative that the user is about or has entered the area at high risk of vehicle-animal collision. The mobile device (or smart vehicle system) may include one or more processors, memory units, a combination of processor(s) and memory unit(s), applications, non-transitory computer instructions, and/or other components that provides for or implements the "means for" functionality noted above. Additionally or alternatively, the transmitting means and/or the receiving means may include a transmitter, receiver, transceiver, processor, memory, and/or other components that provide wireless communication functionality. The mobile device (or smart vehicle system) may include additional, fewer, or alternate functionality, including that discussed elsewhere herein.

XII. Exemplary Remote Server Functionality

In another aspect, a remote server configured to wirelessly issue alerts associated with the likelihood of animal collision to remote mobile devices may be provided. The server may include (i) a memory containing vehicle accident information involving vehicles and animals; (ii) a transceiver configured to receive a location of remote mobile device (or smart vehicle system) that is transmitted from the remote mobile device (or smart vehicle system); and (iii) a processor configured to determine when the remote mobile device (or smart vehicle) is approaching or within a high risk area, the high risk area being an area associated with a high risk for traveling vehicles to collide with animals, wherein when the processor determines the remote mobile device (or smart vehicle) is approaching or is within the high risk area, the processor transmits an alert message via the transceiver to the remote mobile device (or smart vehicle system) to alert a user associated with the remote mobile device (or smart vehicle) of the high risk area. The server may include additional, fewer, or alternate functionality, including that discussed elsewhere herein.

In another aspect, a remote server configured to wirelessly issue alerts associated with the likelihood of animal collision to remote mobile devices (or smart vehicle systems) may be provided. The server may include (i) means for storing vehicle accident information involving vehicles and animals; (ii) transceiver means for wirelessly receiving a location of remote mobile device (or smart vehicle system) that is transmitted from the remote mobile device (or smart vehicle system); and (iii) means for determining when the remote mobile device (or smart vehicle) is approaching or within a high risk area, the high risk area being an area associated with a high risk for traveling vehicles to collide with animals. When it is determined that the remote mobile device (or smart vehicle) is approaching or is within the high risk area, the transceiver means transmits an alert message via the transceiver to the remote mobile device (or smart vehicle system) to alert a user associated with the remote mobile device (or smart vehicle) of the high risk area. The remote server may include one or more processors, memory units, a combination of processor(s) and memory unit(s), applications, non-transitory computer instructions, wireless transceivers, receivers, transmitters, and/or other components that provide for or implements the "means for" functionality noted above. The server may include additional, fewer, or alternate functionality, including that discussed elsewhere herein.

For instance, a remote server located at an insurance provider location may calculate adjustments for insurance premiums, rates, discounts, points, or rewards based upon the amount of time that a specific customer employs the collision avoidance functionality, as discussed elsewhere herein. The remote server may collect data indicating the type and/or amount of usage of collision avoidance functionality utilized by the insured. After which, the remote server may calculate insurance savings for that insured based upon the type and/or amount of usage of collision avoidance functionality.

XIII. Exemplary Server

Figure 10:
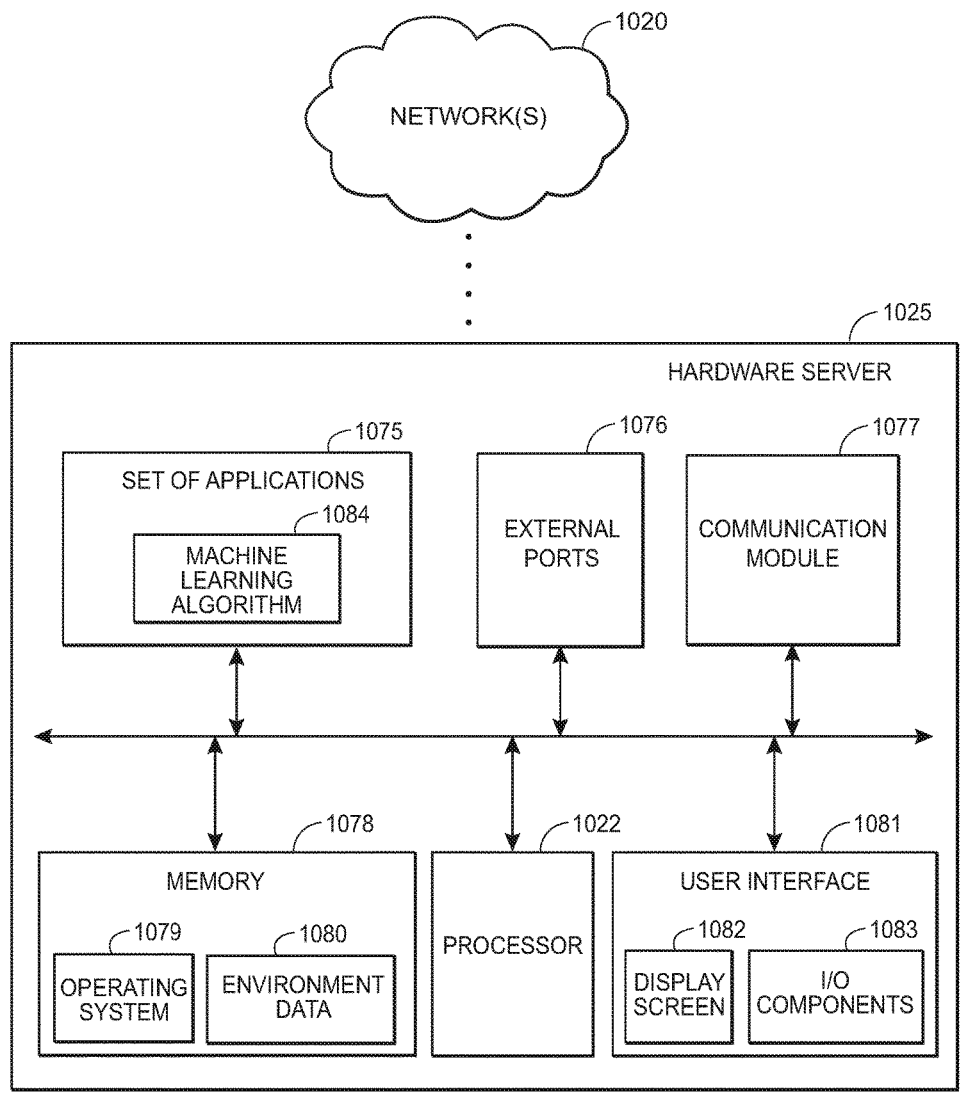
FIG. 10 is a block diagram of a hardware server in accordance with some embodiments.

FIG. 10 illustrates a diagram of an exemplary hardware server 1025 (such as the hardware server 125 as discussed with respect to FIG. 1) in which the functionalities as discussed herein may be implemented. It should be appreciated that the hardware server 1025 may be associated with an insurance provider, as discussed herein.

The hardware server 1025 may include a processor 1022 as well as a memory 1078. The memory 1078 may store an operating system 1079 capable of facilitating the functionalities as described herein. The hardware server 1025 may also store a set of applications 1075 (i.e, machine readable instructions). For example, one of the set of applications 1075 may be a machine learning algorithm 1084 configured to calculate a vehicle's overall level of risk for an animal collision. It should be appreciated that other applications are envisioned.

The processor 1022 may interface with the memory 1078 to execute the operating system 1079 and the set of applications 1075. According to some embodiments, the memory 1078 may also include environment data 1080 that includes information related to environment factors that can impact a vehicle's level of risk for an animal collision. The machine learning algorithm 1084 may access the environment data 1080 to calculate an overall level of risk. The memory 1078 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The hardware server 1025 may further include a communication module 1077 configured to communicate data via one or more networks 1020. According to some embodiments, the communication module 1077 can include one or more transceivers (e.g., WWAN, WLAN, and/or WPAN transceivers) functioning in accordance with IEEE standards, 3GPP standards, or other standards, and configured to receive and transmit data via one or more external ports 1076. For example, the communication module 1077 may send, via the network 1020, a notification to a customer to alert the customer that the vehicle may be at an elevated risk for an animal collision. The processing server 1025 may further include a user interface 1081 configured to present information to a user and/or receive inputs from the user. As shown in FIG. 10, the user interface 1081 may include a display screen 1082 and I/O components 1083 (e.g., ports, capacitive or resistive touch sensitive input panels, keys, buttons, lights, LEDs, speakers, microphones). According to the present embodiments, the user may access the hardware server 1025 via the user interface 1081 to process update the environment data and/or perform other functions. In some embodiments, the hardware server 1025 may perform the functionalities as discussed herein as part of a "cloud" network or can otherwise communicate with other hardware or software components within the cloud to send, retrieve, or otherwise analyze data.

The hardware server 1025 may be a local or remote server. For instance, the hardware server 1025 may be a remote server, such as a remote located server associated with the insurance provider. Additionally or alternatively, the hardware server 1025 may be located on the vehicle and comprise part of the vehicle's communication and/or control system. Other servers may be used.

XIV. Exemplary Electronic Device

Figure 11:
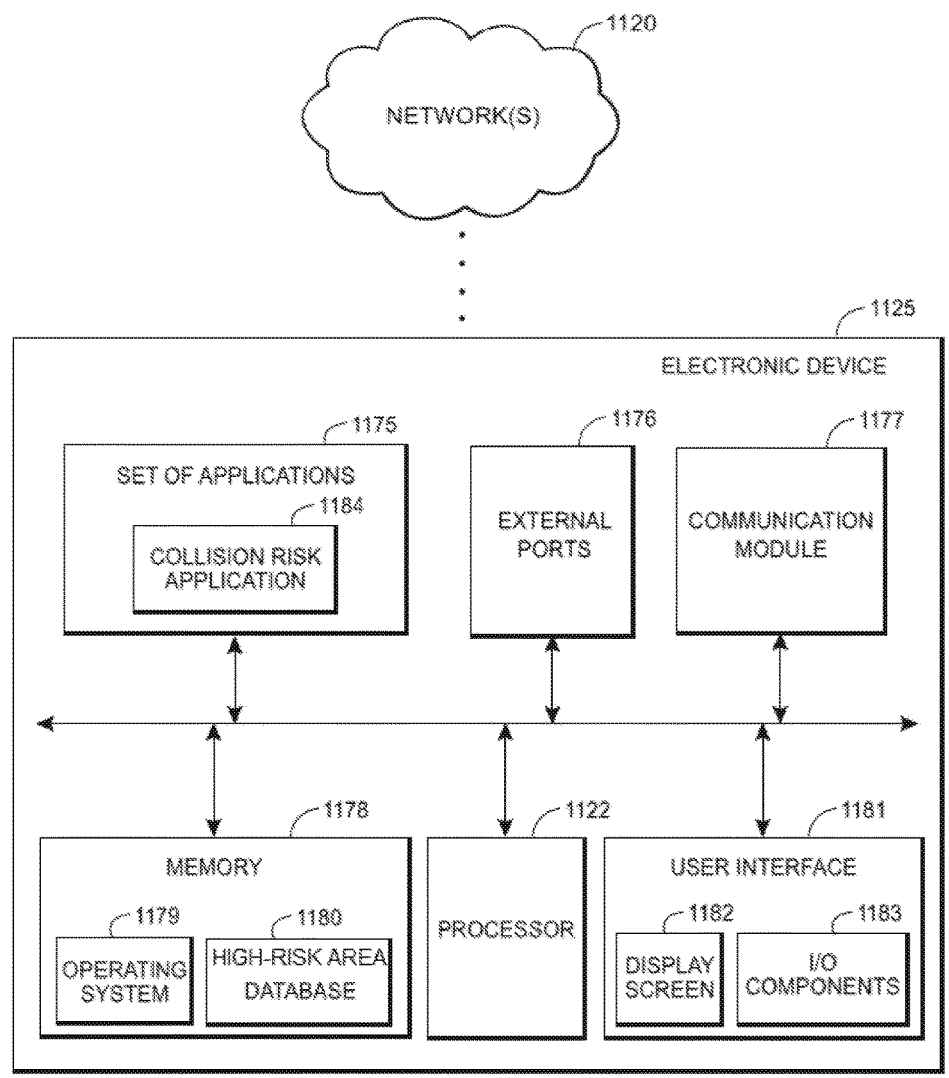
FIG. 11 is a block diagram of an electronic device in accordance with some embodiments.

FIG. 11 illustrates a diagram of an exemplary electronic device 1125 (such as the electronic device 106 as discussed with respect to FIG. 1) in which the functionalities as discussed herein may be implemented. It should be appreciated that the electronic device 1125 may be associated with a driver of a vehicle, as described herein and/or may be a mobile device (e.g., smart phone, etc.), vehicle display, vehicle navigation unit, etc.

The electronic device 1125 may include a processor 1122 as well as a memory 1178. The memory 1178 may store an operating system 1179 capable of facilitating the functionalities as described herein. The electronic device 1125 may also store a set of applications 1175 (i.e, machine readable instructions). For example, one of the set of applications 1175 may be a collision risk application 1184 configured to display a virtual road map and warn the driver about the presence of high-risk areas. It should be appreciated that other applications are envisioned.

The processor 1122 may interface with the memory 1178 to execute the operating system 1179 and the set of applications 1175. According to some embodiments, the memory 1178 may also include high-risk area data 1180 that includes information related to the location of high-risk areas, including where prior vehicle collisions occurred. The collision risk application 1184 may access the high-risk area data 1180 to display the virtual road map and to warn the driver. The memory 1178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 1125 may further include a communication module 1177 configured to communicate data via one or more networks 1120. According to some embodiments, the communication module 1177 may include one or more transceivers (e.g., WWAN, WLAN, and/or WPAN transceivers) functioning in accordance with IEEE standards, 3GPP standards, or other standards, and configured to receive and transmit data via one or more external ports 1176. For example, the communication module 1177 may send, via the network 1120, a notification that the driver has enabled and/or disabled the display of high-risk areas.

As another example, an insurance provider may use a machine learning algorithm to modify the determination of which geographic areas are associated with a high risk of vehicle collisions. In this example, the modifications to where the high-risk areas are located may be received by the electronic device 1125 at the communication module 1177 and stored in the high-risk area database 1180.

The processing server 1125 may further include a user interface 1181 configured to present information to a user and/or receive inputs from the user, in accordance with the functionality described elsewhere herein. As shown in FIG. 11, the user interface 1181 may include a display screen

1182 and I/O components 1183 (e.g., ports, capacitive or resistive touch sensitive input panels, keys, buttons, lights, LEDs, speakers, microphones). According to the present embodiments, the user may access the electronic device 1125 via the user interface 1181 to process update the environment data and/or perform other functions. In some embodiments, the electronic device 1125 may perform the functionalities as discussed herein as part of a "cloud" network or can otherwise communicate with other hardware or software components within the cloud to send, retrieve, or otherwise analyze data.

XV. Additional Exemplary Aspects

In one aspect, the application may gather or receive mapping and/or vehicle navigation information from a local or remote database, such as via wireless communication or data transmission. The application may deploy a graphical user interface that displays a road or other map on a display of a computing device, such as a map centered about a GPS location associated with a vehicle and/or mobile device of the user. High risk areas associated with a higher than normal risk of vehicle collisions or accidents may be virtually superimposed on the road or other map. The high risk areas may be associated with vehicle collisions involving animals, such as deer, and/or other vehicles.

The computing or mobile device may be configured to operate in a number of different modes. In a monitoring mode, a current position of the user may be displayed on a road map, and a number of high risk areas may also be virtually depicted on the road map. The current position and/or high risk areas may be graphically depicted or superimposed on the road map as colored circles. The circles may each be depicted as a certain size or having a radius of a predetermined distance from a specific location, such as an intersection or GPS location.

In the monitoring mode, the outer edge of the circle representing the current position of the user/vehicle may not intersect with any of the edges of the circles representing high risk areas or danger zones. If the user/vehicle moves into a high risk area, the computing or mobile device may go into an alert mode.

In the alert mode, the circle representing the current position of the user/vehicle may intersect or overlap with one or more circles representing high risk areas to provide a graphical depiction of the risk of collision. Also, in the alert mode, the computing or mobile device may provide a warning or alert to the user, such as visual or audible alert. For instance, the graphical user interface may change color or present visual or audible warnings, such as "Deer Alert!" or "Entering High Risk Area for Deer!" if the high risk areas relate to animal-vehicle collisions. If the high risk areas relate to vehicle-vehicle collisions, the visual or audible warnings may include "Approaching High Risk Intersection!", "Approaching Dangerous Intersection!", or "Approaching Dangerous Exit Ramp!"

The high risk areas may be identified from collecting data of vehicle accidents, and type of accident, over time. For instance, the data may be collected by an insurance provider and/or from insurance claims related to vehicle accidents. Other databases may be used, such as DMV (Department of Motor Vehicles), DOT (Department of Transportation), police, or third party databases. For example, the database of vehicle accident information may include police report information detailing vehicle accidents and/or deer collisions. Additionally or alternatively, the data may be received directly from drivers (via submitting accident information using their mobile devices, for example) involved in accidents, such as deer collisions, and/or vehicle-vehicle accidents. The location data for each accident may include latitude and longitude coordinates.

As a vehicle travels, accident data may be retrieved associated with a given radius of the vehicle—such as a 5 or 10 mile radius around the current vehicle location—which may be the area currently being monitored for danger zones. When a blue dot representing the current vehicle location enters a danger zone, an audible alert (such as "Beware!") may be generated.

To prevent seeking too much data and slowing mobile device performance, if the user zooms out on the map, less granular or detailed data may be asked for. Alternatively, if the user zooms in on the map, more granular or detailed data may be asked for and/or retrieved from a vehicle accident database.

The danger zones represented on the display may be filtered or selectively selected. For instance, each danger zone may represent a single accident, such as vehicle-vehicle accident or vehicle-deer collision.

Displayed danger zones may be filtered or selected based upon TOD (time of day) and/or DOY (day of year) of the respective accident. For instance, if today is March $15^{th}$, only accidents within two weeks of March $15^{th}$ may be selected (i.e., only accidents that occurred from March $1^{st}$ to March $29^{th}$). Also, only accidents that occurred within a pre-determined time of the current time, such as 2 hours, may be displayed. For instance, if the current time is 8 a.m., only accidents that occurred from 6 to 10 a.m. may be displayed as danger zones, or if the current time is 7 p.m., only accidents that occurred from 5 p.m. to 9 p.m. may be displayed. Additionally or alternatively, time periods associated with sunrise or sunset, or daylight or night time, may be used. In one embodiment, only data or accidents from the past 5 years may be used.

Thus, danger zones that virtually represent vehicle accidents may be displayed or selected to be displayed based upon their latitude and longitude, time of day, and/or calendar day, as well as other factors. Using TOD and DOY information may be most relevant to deer collision danger zones. Different filtering may be used for vehicle-vehicle accidents. For instance, a red circle may be displayed for an intersection if there have been at least 40 strikes or accidents within the past five years at that location.

With respect to the Figures, FIG. 5A shows an exemplary monitoring mode (monitoring but not in alert status), and the current mobile device/vehicle location (such as a blue flashing dot). The vehicle is approaching several danger areas (such as brown circles). FIG. 5B shows an exemplary alert status or mode. When the current vehicle location moves within a radius of a danger zone, a voice alert of "Beware!" may sound. When the current vehicle location moves out of the danger zone(s), a voice alert of "Relax" may sound.

FIG. 6A shows an exemplary virtual map with circles of a first color, such as brown, superimposed on the map. The brown circles may represent danger areas, in particular, past deer-vehicle collisions. FIG. 6B shows that in addition to deer collision danger zones (shown with slanted lines internal to the circles), danger zones associated with vehicle-vehicle accidents, such as dangerous intersections, may also be shown (shown with dots within the circles). During use, the danger zones associated with vehicle-vehicle accidents may be shown in a second color, such as red. The current vehicle/mobile device GPS location may be shown in a third color, such as a flashing blue circle (not shown).

FIG. 7 depicts a mobile device (or vehicle navigation unit) control panel for adjusting the user interface functionality and visuals. The map may be toggled between a virtual road map and a satellite map. Deer collisions and dangerous intersections may be displayed, or that functionality may be disabled/turned off. Alerts may be audible or vibration (haptic).

XVI. Additional Exemplary Embodiments

In one aspect, a computer-implemented method of alerting drivers of high risk areas may be provided. The method may include (1) collecting, via one or more processors, data detailing vehicle accidents and/or locations of vehicle accidents; (2) displaying, via one or more processors, a virtual road map associated with a current location of a vehicle; (3) generating, via one or more processors, virtual representations or icons associated with the vehicle accidents; (4) superimposing, via one or more processors, the virtual representations or icons associated with the vehicle accidents on the virtual road map; (5) monitoring, via one or more processors, the current location of the vehicle; and/or (6) when the current location of the vehicle comes within a predetermined distance of a location of a vehicle accident, generating, via one or more processors, a warning to alert a driver of the vehicle that they are in, or entering, a high risk area associated with a higher than average risk of vehicle accident to facilitate safer driver and reduce a number of vehicle accidents.

The method may include additional, less, or alternate actions, including those discussed elsewhere herein. For instance, the method may include adjusting an insurance policy, rate, premium, or discount based upon an insured having the collision alert functionality installed on their vehicle or mobile device, and/or an amount of usage of the collision alert functionality by the insured.

In another aspect, a computer-implemented method of alerting drivers of high risk areas may be provided. The method may include (1) displaying, via one or more processors, a virtual road map and a virtual representation of a current location of a vehicle superimposed on the virtual road map; (2) generating, via one or more processors, virtual representations or icons associated with high risk areas, the high risk areas corresponding to past vehicle accidents; (3) superimposing, via one or more processors, the virtual representations or icons associated with the past vehicle accidents on the virtual road map at locations where the past vehicle accidents occurred; (4) monitoring, via one or more processors, the current location of the vehicle; and/or (5) updating, via one or more processors, the virtual representation of the current location of the vehicle as the vehicle travels on a road to present a graphical depiction of the relationship and/or distance between the current location of the vehicle and one or more high risk areas to facilitate alerting drivers when they are in or about to enter high risk areas associated with past vehicle accidents. The method may include additional, less, or alternate actions, including those discussed elsewhere herein.

For instance, the method may include when the current location of the vehicle comes within a predetermined distance of a location of a vehicle accident, generating, via one or more processors, a warning to alert a driver of the vehicle that they are in or entering a high risk area associated with a higher than average risk of vehicle accident to facilitate safer driver and reduce a number of vehicle accidents. Additionally or alternatively, the method may include adjusting insurance policy, rate, premium, or discount based upon an insured having the collision alert functionality installed on their vehicle or mobile device, and/or an amount of usage of the collision alert functionality by the insured.

In another aspect, a graphical user interface for alleviating the risk of vehicle collision may be provided. The graphical user interface may include (1) a virtual road map; (2) an icon virtually representing a current location of a vehicle, the icon being superimposed on the virtual road map at the current location of the vehicle; (3) a first virtual danger zone representing a past collision involving an automobile and a deer, the first virtual danger zone being superimposed on the virtual road map at the latitude and longitude of the past collision; and/or (4) a second virtual danger zone representing a past accident involving two vehicles, the second virtual danger zone being superimposed on the virtual road map at the latitude and longitude of the past accident to provide a graphical representation of the current location of the vehicle with respect to the first and second virtual danger zones and facilitate alerting a driver of locations of areas of higher than average risk of vehicle collision or accident. The graphical user interface may also be configured to generate the alerts discussed herein. The graphical user interface may include additional, less, or alternate functionality, including that discussed elsewhere herein.

XVII. Additional Considerations

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force (i.e., the policyholder is enrolled).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of processing vehicle collision risk information, the method comprising:
   receiving, by a processor, vehicle data including an indication of at least a current GPS (Global Positioning System) location of at least one of an automobile or a mobile device located within the automobile;
   accessing, by the processor, environment data associated with the current GPS location of the at least one of the automobile or the mobile device, the environment data including a historical record of automobile-animal collisions (i) at the current GPS location of the at least one of the automobile or the mobile device, or (ii) in a particular proximity to the current GPS location of the at least one of the automobile or the mobile device;
   based upon the environment data and the current GPS location, determining, by the processor, that the automobile is at a risk greater than a threshold level for a non-avian animal collision, the threshold level being a level of risk greater than zero risk;
   generating, by the processor, a notification indicating the risk greater than the threshold level of collision with a non-avian animal; and
   communicating, from the processor, the notification of the risk greater than the threshold level to the at least one of the automobile or the mobile device so as to allow an operator of the automobile to be notified of the risk greater than the threshold level.

2. The computer-implemented method of claim 1, wherein communicating the notification to the at least one of the automobile or the mobile device comprises:
   communicating the notification to at least one of an onboard computer of the automobile or an electronic device associated with an operator of the automobile.

3. The computer-implemented method of claim 1, wherein the vehicle data further includes:
   at least one of a speed of the automobile, automobile characteristics, or demographic information associated with an operator of the automobile.

4. The computer-implemented method of claim 1, wherein the environment data further includes:
   at least one of ecological characteristics or roadway characteristics.

5. The computer-implemented method of claim 1, wherein the environment data includes a first environment factor having a first specific weight and a second environment factor having a second specific weight, and wherein determining that the automobile is at the risk greater than the threshold level comprises:
   calculating an overall risk based on combining the first environment factor and the second environment factor.

6. The computer-implemented method of claim 1, further comprising:
   identifying at least one of a time of day or a time of year, wherein determining that the automobile is at the risk greater than the threshold level is further based upon a portion of the environment data corresponding to the at least one of the time of day or the time of year.

7. The computer-implemented method of claim 1, further comprising:
   receiving an animal collision report indicating that the automobile collided with a non-avian animal.

8. The computer-implemented method of claim 1, wherein determining that the automobile is at the risk greater than the threshold level includes executing a machine learning algorithm.

9. The computer-implemented method of claim 8, wherein determining that the automobile is at the risk greater than the threshold level includes executing a machine learning algorithm, the method further comprising:
updating the machine learning algorithm according to the animal collision report.

10. A system for processing vehicle collision risk information, comprising:
a memory adapted to store non-transitory computer executable instructions, and
a processor adapted to interface with the communication module, wherein the processor is configured to execute the non-transitory computer executable instructions to cause the processor to:
receive vehicle data including an indication of at least a current GPS (Global Positioning System) location of at least one of an automobile or a mobile device located within the automobile,
access at least a portion of the environment data associated with the current GPS location of the at least one of the automobile or the mobile device, the environment data including a historical record of automobile-animal collisions (i) at the current GPS location of the at least one of the automobile or the mobile device, or (ii) in a particular proximity to the current GPS location of the at least one of the automobile or the mobile device;
based upon the environment data and the current GPS location, determine, via the processor, that the automobile is at a risk greater than a threshold level for a non-avian animal collision, the threshold level being a level of risk greater than zero risk; and
generate a notification indicating the risk greater than the threshold level of collision with a non-avian animal for display on at least one of the automobile or the mobile device so as to allow an operator of the automobile to be notified of the risk greater than the threshold level.

11. The system of claim 10, wherein the processor if further configured to communicate the notification to the at least one of an onboard computer of the automobile or an electronic device associated with an operator of the automobile.

12. The system of claim 10, wherein the vehicle data further includes at least one of a speed of the automobile, automobile characteristics, or demographic information associated with an operator of the automobile.

13. The system of claim 10, wherein to access the environment data, the processor is configured to execute the non-transitory computer executable instructions to cause the processor to:
access at least one of ecological characteristics or roadway characteristics.

14. A computer-implemented method of issuing an alert associated with a vehicle-animal collision, the method comprising:
accessing, via a processor, environment data that includes a historical record of automobile-animal collisions (i) at a current GPS location of at least one of an automobile or a mobile device located within the automobile, or (ii) in a particular proximity to the current GPS location of the at least one of the automobile or the mobile device, the processor being located remotely from the automobile;
predicting, based upon the environment data, (1) a geographical scope, (2) a temporal scope, and (3) a seasonal scope of an area at a risk greater than a threshold level of being associated with a collision with a non-avian animal when a non-avian animal is not detected at the automobile, the threshold level being a level of risk greater than zero risk;
monitoring or identifying the current GPS location of the mobile device located within the automobile via the processor;
monitoring or identifying a current time of day via the processor;
monitoring or identifying a current time of year via the processor; and
when, as determined by the processor, (a) the current GPS location of the mobile device matches, or is within, the geographical scope of the area at the risk greater than the threshold level, (b) the current time of day matches, is within, or coincides with the temporal scope of the area at the risk greater than the threshold level, and (c) the current time of year matches, is within, or coincides with the seasonal scope of the area at the risk greater than the threshold level, generating an alert indicating the risk greater than the threshold level for the automobile.

15. The computer-implemented method of claim 14, wherein the alert comprises at least one of an audible alert, a visual alert, or a haptic alert.

16. The computer-implemented method of claim 14, the method further comprising the processor transmitting the alert to the automobile or mobile device, and determining whether or not the automobile is moving before transmitting the alert.

17. The computer-implemented method of claim 16, the method further comprising adjusting at least one of an insurance premium, a discount, or a reward based upon the mobile device being configured to receive the alert.

18. The computer-implemented method of claim 14, wherein predicting the area at the risk greater than the threshold level of being associated with a collision with a non-avian animal is further based upon analyzing at least one of automobile accidents, driver characteristics, animal tendencies, weather data, calendar data, time of day, or geographical information.

19. The computer-implemented method of claim 14, the method further comprising adjusting at least one of an insurance premium, a discount, or a reward based upon the mobile device being configured to receive the alert.

\* \* \* \* \*